United States Patent [19]

Miyachi

[11] Patent Number: 4,587,708
[45] Date of Patent: May 13, 1986

[54] CHUCK JAW CHANGER FOR A MACHINE TOOL

[75] Inventor: Chihiro Miyachi, Nagoya, Japan

[73] Assignees: Howa Kogyo Kabushiki Kaisha; Kabushiki Kaisha Yamazaki Tekkosho, both of Aichi, Japan

[21] Appl. No.: 609,202

[22] Filed: May 11, 1984

[30] Foreign Application Priority Data

May 18, 1983 [JP] Japan ................................. 58-88050

[51] Int. Cl.4 ........................................... B23Q 3/155
[52] U.S. Cl. ...................................... 29/568; 279/123
[58] Field of Search ................. 29/26 A, 568; 408/35; 279/123

[56] References Cited

U.S. PATENT DOCUMENTS

| | | | |
|---|---|---|---|
| 3,779,391 | 12/1973 | Sato et al. | 29/568 X |
| 4,100,671 | 7/1978 | Junike et al. | 29/568 |
| 4,313,252 | 2/1982 | Kuska et al. | 29/568 |

*Primary Examiner*—Z. R. Bilinsky
*Attorney, Agent, or Firm*—Wenderoth, Lind & Ponack

[57] ABSTRACT

A chuck jaw changer is disclosed as mounted on the headstock (24) of an N/C lathe (22) for automatically changing the set of gripping jaws (32) of a quick change chuck (28) on a work spindle (26) with any of other interchangeable sets of gripping jaws (32') being held by a rotary, indexing jaw magazine (34). The jaw magazine has formed therein several jaw grooves (150) each for holding one set of gripping jaws (32'), or the jaw set (32) withdrawn from the chuck, slidably engaged therein in a row. An indexing mechanism (35) revolves the jaw magazine relative to the machine tool for bringing any of the jaw grooves into line with that one of radial jaw guideways (54) of the chuck which is being held in a prescribed jaw change position on the work spindle. A jaw transfer mechanism (36) operates for successively transferring the set of jaws from the chuck into an empty jaw groove in the jaw magazine, and a different set of jaws from the jaw magazine to the chuck. Thus the transfer of each set of gripping jaws from the chuck to the jaw magazine or vice versa can be completed while the magazine is held at a standstill on the machine tool.

19 Claims, 13 Drawing Figures

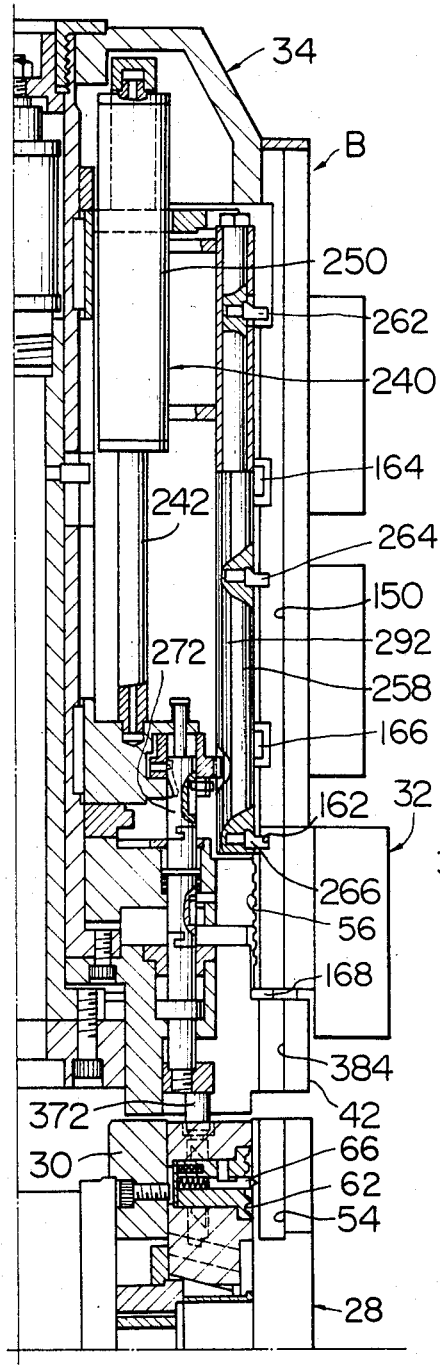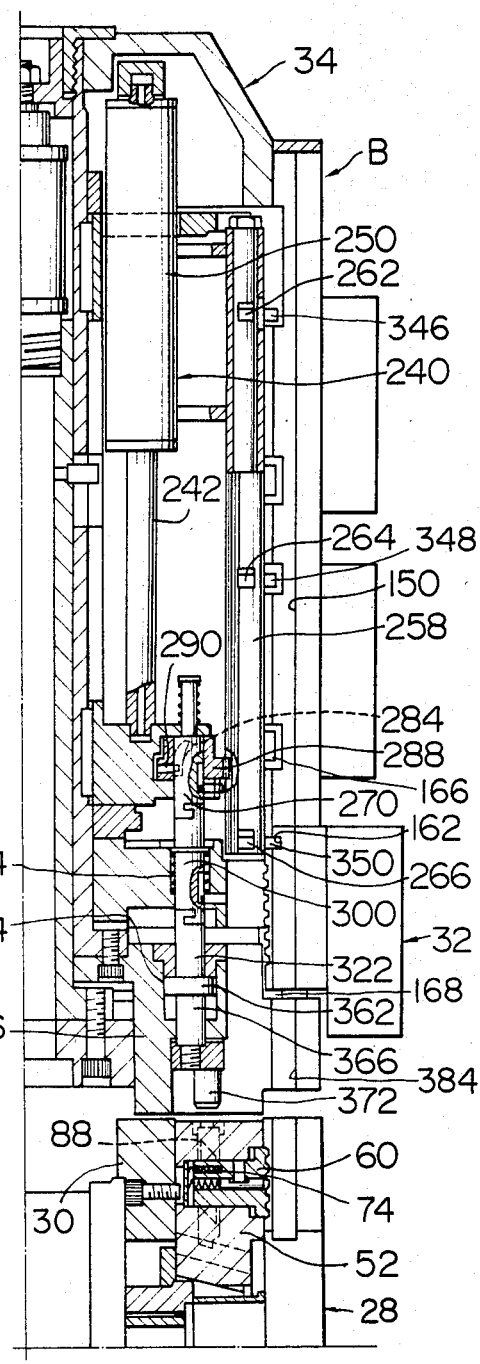

CHUCK JAW CHANGER FOR A MACHINE TOOL

BACKGROUND OF THE INVENTION

This invention relates to machine tools in general and, in particular, to lathes or like machines having a chuck with adjustable gripping jaws for holding work to be operated upon. The invention is directed more specifically to a chuck jaw changer for use with such a machine tool for automatically changing the gripping jaws of the chuck as required by the varying sizes of work to be held thereby.

With the advent and dissemination of the numerical control (N/C or NC) technique, the metalworking industry has concentrated research and development efforts on the automation of all phases of machine tooling for higher production and less human labor. The change of chuck jaws is no exception. A variety of devices have been suggested, with some accepted commercially, for autmatically changing the sets of gripping jaws of chucks on lathes and other classes of machine tools. These prior art devices are subject to the objection, however, that the number of interchangeable sets of jaws is rather limited in comparison with the size of the device. A chuck jaw changer for installation on a machine tool should be as compact as possible to avoid interference with the operation of the machine tool itself. Contrary to this requirement is the current demand for a greater number of interchangeable sets of jaws. Another demand currently imposed by the metalworking industry on chuck jaw changers is the reduction of the period of time required for a change from one set of jaws to another.

SUMMARY OF THE INVENTION

The present invention provides a novel chuck jaw changer which makes possible a quicker change from one set of gripping jaws to another than heretofore and which can hold in stock any required number of interchangeable jaw sets without the possibility of interference with the operation of the machine tool for use therewith.

The chuck jaw changer in accordance with the invention may be broadly summarized as comprising a chuck having a chuck body to be mounted on the work spindle of a machine tool, with a set of gripping jaws removably engaged in respective radial jaw guideways in the chuck body. Each gripping jaw is to be slid into and out of one jaw guideway when that guideway is held in a prescribed first jaw change position on the work spindle. Movably mounted on the machine tool is an indexing jaw magazine having jaw grooves each for holding an additional set of gripping jaws, or the first recited set of gripping jaws on being withdrawn from the chuck body, slidably engaged therein in a row. The jaw magazine is provided with an indexing mechanism thereby to be moved relative to the machine tool so as to bring any of the jaw grooves, with or without a set of gripping jaws engaged therein, to a preassigned second jaw change position where that jaw groove is in line with that one of the jaw guideways in the chuck body which is in the first jaw change position. The jaw magazine is so adapted that the aligned gripping jaws in the first and second jaw change positions are held at constant pitch distances. Further included is a jaw transfer mechanism reciprocably movable between the chuck and the jaw magazine a distance equal to the pitch distance between the gripping jaws aligned in the first and second jaw change positions. The jaw transfer mechanism can simultaneously engage the set of gripping jaws being held in the jaw groove in the second jaw change position for transferring the same, by the repetition of the reciprocating movement between chuck and jaw magazine, into the successive jaw guideways that are brought to the first jaw change position. Further the jaw transfer mechanism can engage the gripping jaw in the jaw guideway being held in the first jaw change position for transferring the same into the empty jaw groove being held in the second jaw change position.

It is to be appreciated that each jaw groove in the jaw magazine holds a complete set of gripping jaws, which can be successively transferred into the separate jaw guideways in the chuck body as these guideways are moved to the first jaw change position one after another by the stepwise rotation of the work spindle of the machine tool. The jaws in the chuck body guideways can also be successively carried into an empty jaw groove in the jaw magazine being held in the second jaw change position. Each set of gripping jaws can thus be transferred from chuck body to jaw magazine, or vice versa, while the latter is standing still on the machine tool. This greatly shortens the jaw change time in comparison with the case where the jaw magazine holds one jaw in each groove and so must be indexed for each jaw to be transferred to or from the chuck body.

The mounting of each set of jaws in one jaw groove in the jaw magazine yields another advantage that the magazine can be installed on a smaller area on the machine tool than if each jaw groove holds one jaw. The number of interchangeable sets of jaws may therefore be increased as required without the possibility of bringing about inconveniences to the machine tool operation.

The jaw transfer mechanism is also well calculated for the simplicity of construction. It linearly travels back and forth a distance equal to the pitch of the jaws aligned in the first and second jaw change positions, for successive jaw transfer between chuck and magazine. Thus a simple linear actuator such as a fluid actuated cylinder may be employed for such travel of the jaw transfer mechanism over the variable distance.

In a preferred embodiment the jaw magazine takes the form of an upstanding cylinder, with the jaw grooves defined in its periphery so as to extend parallel to its axis at constant circumferential spacings. Both indexing mechanism and jaw transfer mechanism can be advantageously housed within the cylindrical jaw magazine for the provision of a compact chuck jaw changer.

It is also recommended that, notwithstanding the compactness of the apparatus, the jaw magazine together with the indexing mechanism and the jaw transfer mechanism housed therein be made retractable on the machine tool, as in the embodiment disclosed herein. The jaw magazine, the indexing mechanism, the jaw transfer mechanism, and other parts hereinafter set forth constitute in combination what is herein termed a jaw change assembly. Held retracted away from the chuck during the usual operation of the machine tool, the jaw change assembly will present no impediment at all to the machine tool operation and will further be free from the attack of the chips or cutting oil.

The above and other features and advantages of the present invention and the manner of realizing them will become more apparent, and the invention itself will best be understood, from a study of the following description and appended claims, with reference had to the attached drawings showing a preferred embodiment of the invention.

BRIEF DESCRIPTION OF THE DRAWINGS

FIGS. 12 and 13 are views similar to FIG. 10 but showing the chuck jaw changer in further different steps in its operation.

DETAILED DESCRIPTION OF THE INVENTION

General

Figure 1:
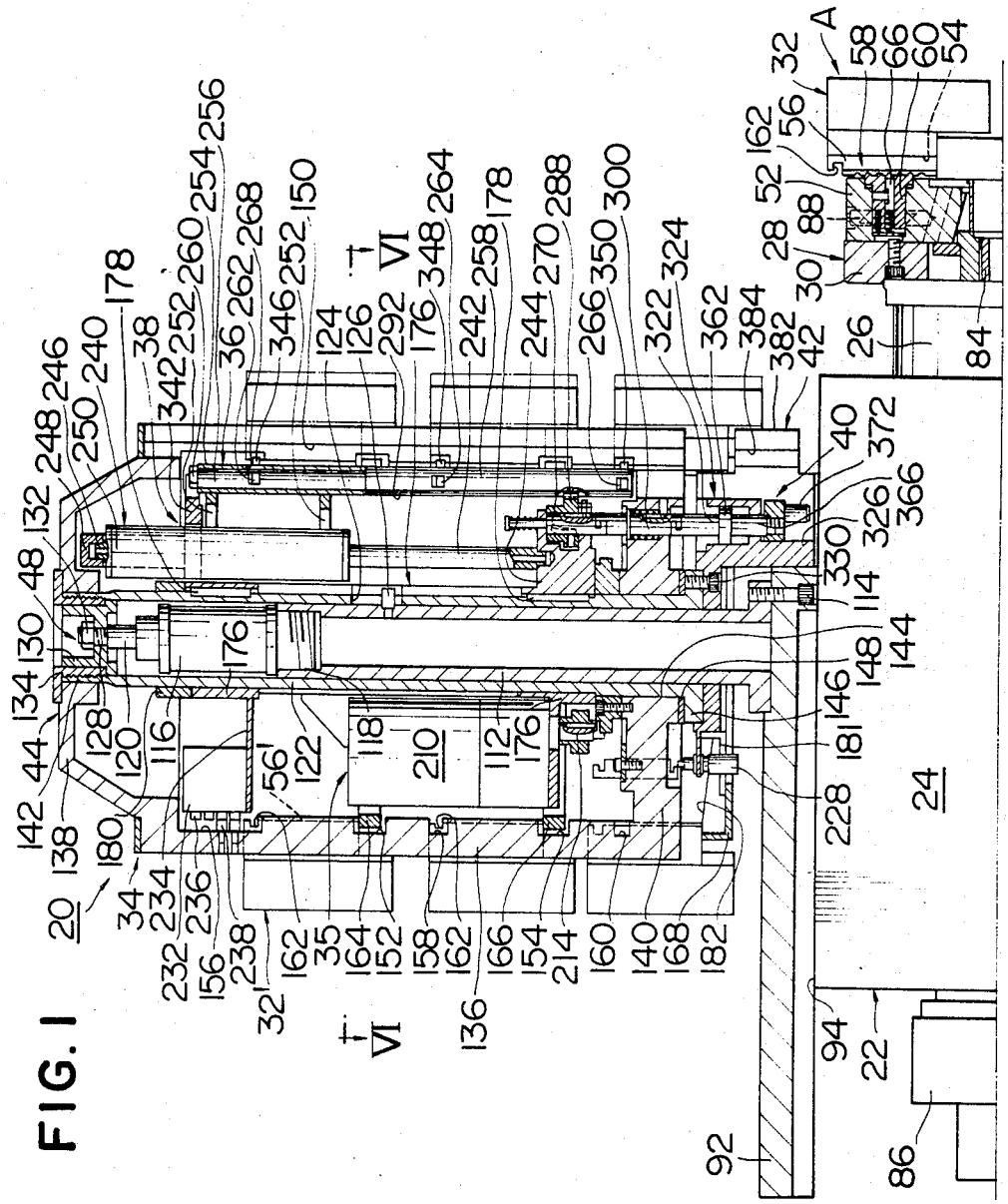
FIG. 1 is a vertical section through the chuck jaw changer constructed in accordance with the principles of the present invention and as mounted in position on a lathe, the view showing the jaw change assembly in retracted position.

The chuck jaw changer in accordance with the invention is generally labeled 20 is FIGS. 1 through 4 and therein shown as structured for use with an N/C lathe 22 as an example of machine tool to which the invention finds application. Inasmuch as the N/C lathe 22 is familiar to the machine tool specialists, only its headstock 24 and work spindle 26 projecting forwardly (rightwardly as viewed in FIGS. 1 through 3) therefrom are shown for simplicity.

Conventionally mounted on the work spindle 26 of the N/C lathe 22 is a quick change chuck 28 which may be considered a part of the chuck jaw changer 20 for the purposes of the invention. The chuck 28 comprises a chuck body 30 rigidly attached to the work spindle 26, and a set of gripping jaws 32 replaceably mounted on the chuck body and normally locked against displacement relative to the same. The jaw changer 20 automatically changes the jaw set 32 on the chuck body 30 with any of several other different sets of gripping jaws 32' held in stock thereby.

With reference further to FIGS. 1 through 4 the exemplified chuck jaw changer 20 additionally comprises:

1. a rotary, indexing jaw magazine 34 operatively mounted on the headstrock 24 of the lathe 22 and releasably holding the additional sets of gripping jaws 32' at constant circumferential spacings thereon;

2. a magazine indexing mechanism 35 for incrementally revolving the jaw magazine 34 relative to the lathe 22 so as to bring any desired one of the gripping jaw sets 32' into alignment with the chuck 28 for jaw change;

3. a jaw transfer mechanism 36 for transferring the sets of gripping jaws 32 and 32' between chuck body 30 and jaw magazine 34;

4. a retractable retainer assembly 38 closely associated with the jaw transfer mechanism 36 for temporarily holding the gripping jaws 32 and 32' on the jaw magazine 34 during their transfer to or from the chuck body 30;

5. an unlocking mechanism 40 for unlocking the gripping jaws 32 from the chuck body 30 preparatory to their transfer to the jaw magazine 34; and 6. A jaw guide 42 for guiding the gripping jaws 32 and 32' being transferred by the transfer mechanism 36 between chuck body 30 and jaw magazine 34.

Figure 2:
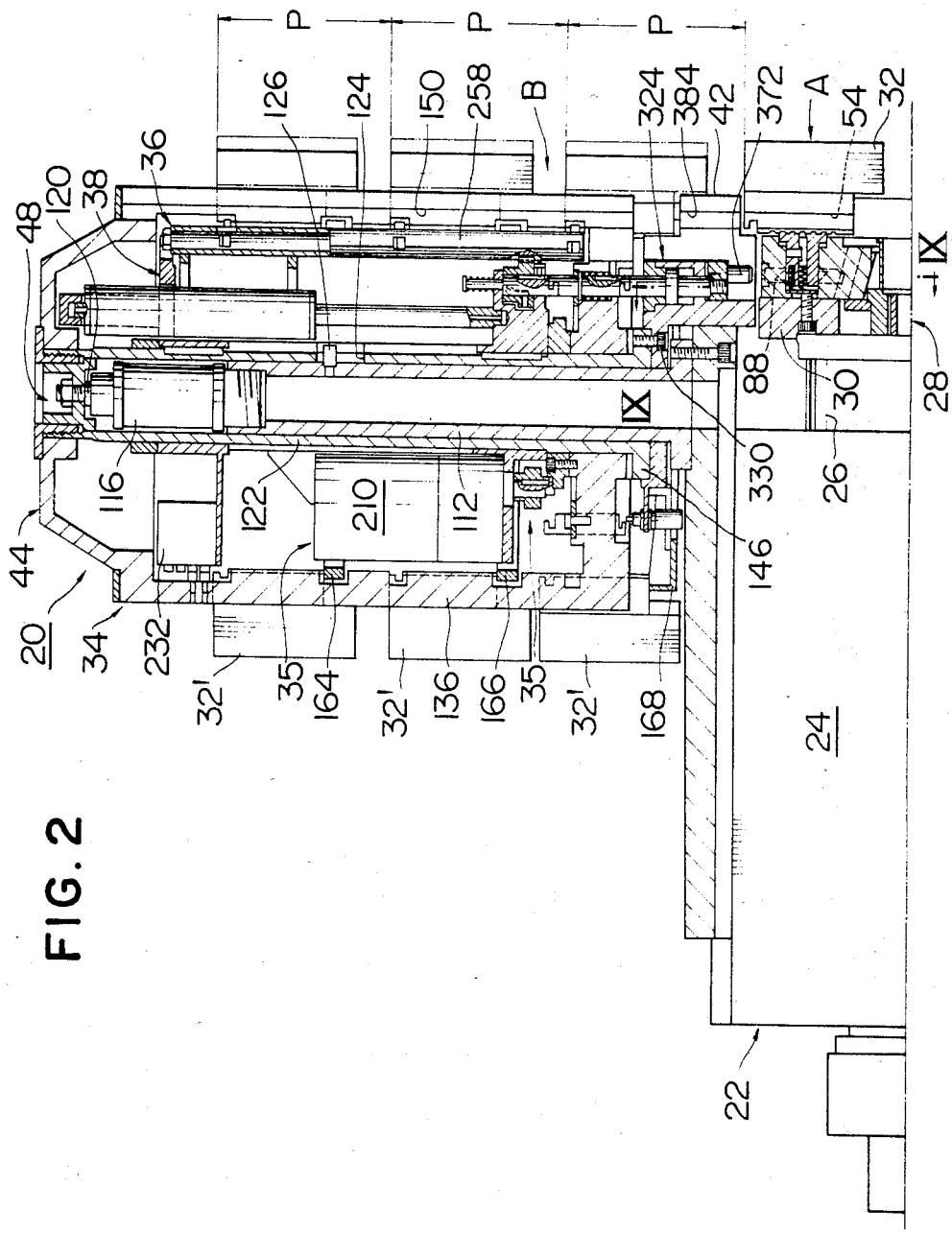
FIG. 2 is a view similar to FIG. 1 except that the jaw change assembly is shown in a working position for jaw change.
Figure 3:
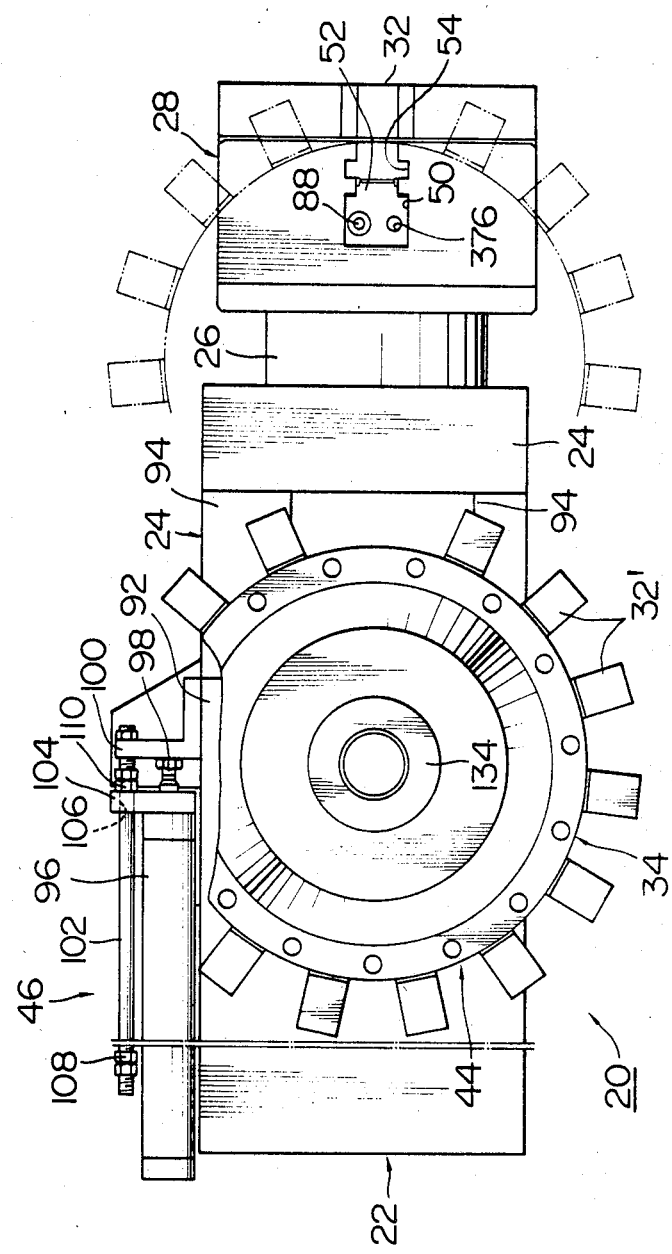
FIG. 3 is a top plan of the complete apparatus, depicting the retracted position of the jaw change assembly by the solid lines and the working position thereof by phantom outlines.
Figure 4:
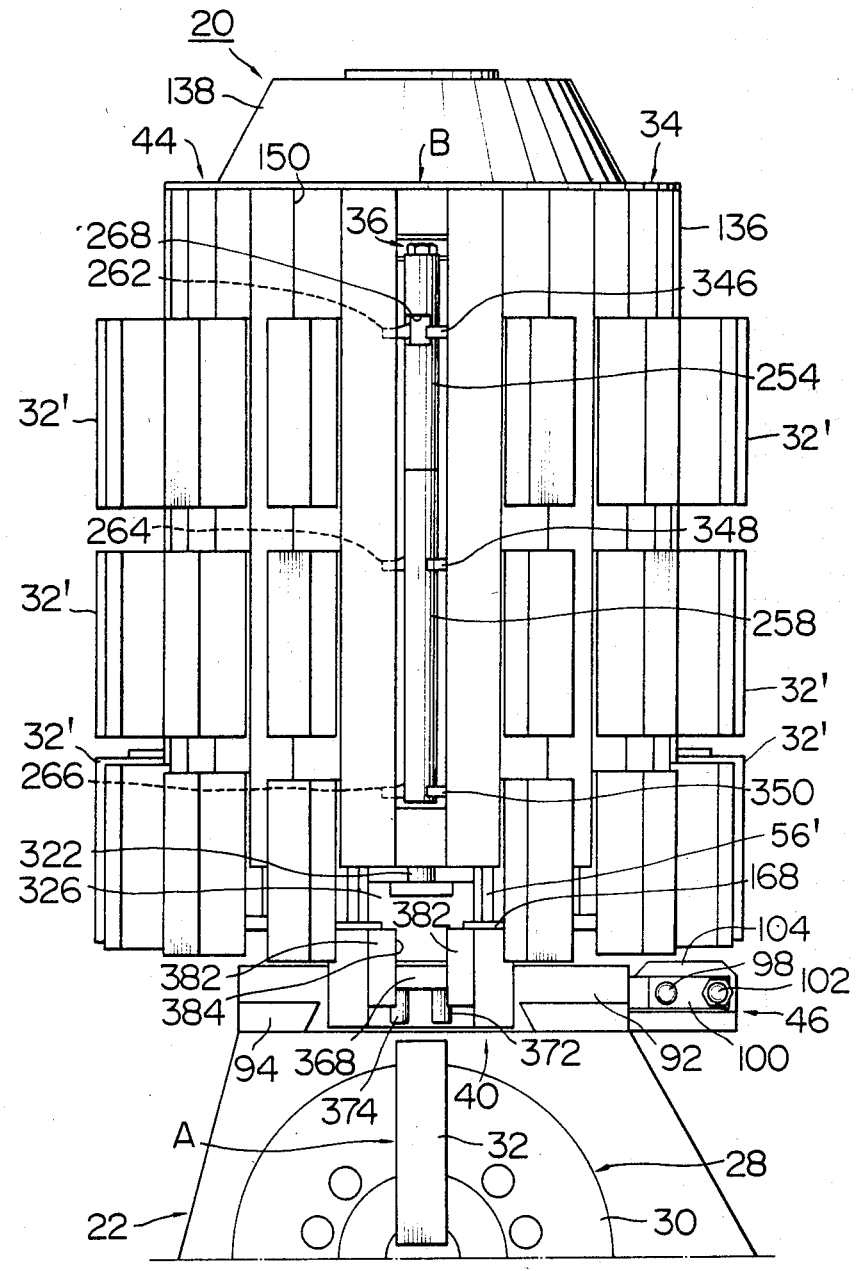
FIG. 4 is an elevation of the complete apparatus as seen from the right hand side of FIG. 1.

The above listed components 34, 35, 36, 38, 40 and 42 all constitute parts of a jaw change assembly 44 mounted on the headstock 24 of the lathe 22 for movement between a retracted position of FIG. 1 and a working position of FIG. 2. The jaw change assembly 44 stays in the retracted position during the usual machining operation of the lathe 22. When moved to the working station, then, the jaw change assembly 44 operates to change the jaw set 32 on the chuck body 30 with any desired one of the other jaws sets 32' on the jaw magazine 34. Provided for such movement of the jaw change assembly 44 between the working and retracted positions on the lathe 22 are:

1. a longitudinal transport mechanism 46, FIGS. 3 and 4, for reciprocably moving the jaw change assembly 44 longitudinally of the work spindle 26 of the lathe 22; and 2. a radial transport mechanism 48, FIGS. 1 and 2, for reciprocably moving the jaw change assembly 44 radially of the work spindle 26 or of the chuck 28 thereon.

In the illustrated embodiment the radial transport mechanism 48 moves the jaw change assembly 44 vertically. The word "radial" is used because the jaw change assembly 44 may not necessarily travel vertically, but only radially of the work spindle 26, depending upon the angular position of the chuck jaw changer 20 on the machine tool about the axis of the work spindle. The longitudinal transport mechanism 46 moves the jaw change assembly 44 between a rear position of FIG. 1, away from the chuck 28, and a front position of FIG. 2, closer to the chuck. The radial transport mechanism 48 moves the jaw change assembly 44 between an upper position of FIG. 1, radially outward of the chuck 28, and a lower position of FIG. 2, radially inward of the chuck. The jaw change assembly 44 is in the retracted position when held in the rear position by the longitudinal transport mechanism 46 and in the upper position by the radial transport mechanism 48. In its working position, on the other hand, the jaw change assembly 44 is held in the front position by the longitudinal transport mechanism 46 and in the lower position by the radial transport mechanism 48.

Given hereafter is a more extensive discussion of the above listed components of the chuck jaw changer 20, which for convenience wll be divided under several headings, followed by the operational description of the complete apparatus. The listed components will be discussed in the following order:

1. Quick change chuck 28.
2. Longitudinal transport mechanism 46.
3. Radial transport mechanism 48.
4. Jaw magazine 34.
5. Magazine indexing mechanism 35.
6. Jaw transfer mechanism 36.
7. Retractable retainer assembly 38.
8. Unlocking mechanism 40.
9. Jaw guide 42.

Quick Change Chuck

Figure 5:
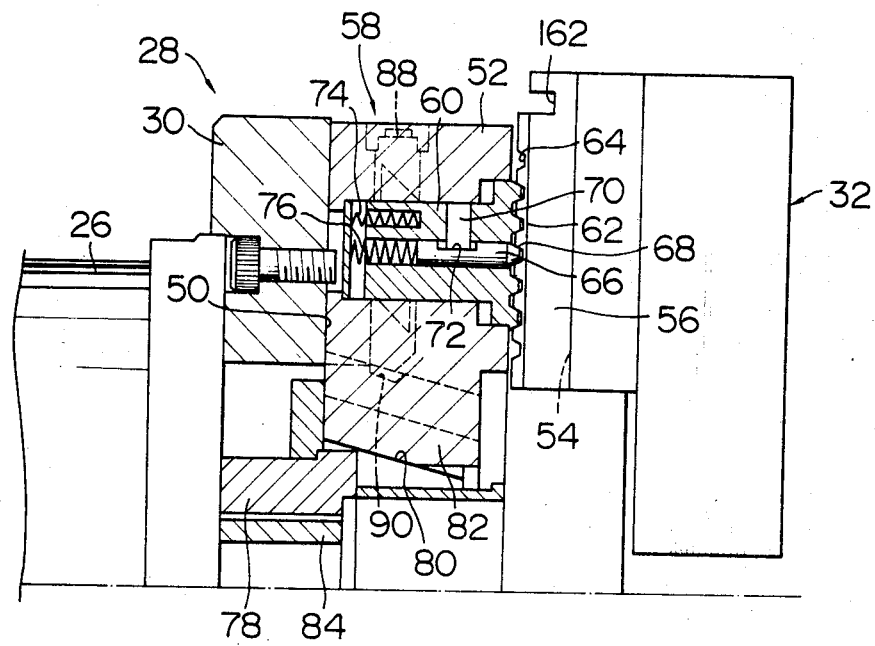
FIG. 5 is an enlarged, fragmentary axial section through the quick change chuck mounted in position on the lathe of FIG. 1 for use with or in the chuck jaw changer of this invention.

Although the lathe chuck 28 is shown sectioned in FIGS. 1 and 2, FIG. 5 better illustrates its construction on an enlarged scale. As will be seen also from its front view given in FIG. 4, the particular chuck adopted here is of the type known as the three jaw universal chuck, having the three gripping jaws 32 jointly moved in and out by a wedging action. It is to be understood, however, that other types of chucks could be employed within the scope of this invention.

Mounted on the work spindle 26 for simultaneous rotation therewith, the chuck body 30 has three radial guideways 50 formed therein at constant angular spacings about the axis of the work spindle 26. Each guideway 50 slidably receives a slide 52. Another set of three radial guideways 54 are defined in the chuck body 30 for slidably receiving the T sectioned shoe portions 56 of the respective gripping jaws 32. These shoe portions are opposed to the respective slides 52 within the chuck body 30.

A locking mechanism 58 locks each gripping jaw 32 against radial displacement relative to the opposed one of the slides 52 and, in consequence, to the chuck body 30. Each locking mechanism 58 comprises a primary detent 60 mounted in each slide 52 for sliding motion toward and away from the shoe portion 56 of the opposed gripping jaw 32 in a direction parallel to the work spindle 26. The primary detent 60 has a series of teeth 62 cut in its front face for positive engagement with a series of complementary teeth 64 on the opposed surface of the gripping jaw shoe portion 56. A secondary detent 66 is mounted in each primary detent 60 for sliding motion in a direction parallel to the work spindle 26. This secondary detent also has a tooth 68 on its front face for positive engagement with the teeth 64 on the gripping jaw shoe portion 56. A key 70 is embedded radially in the primary detent 60 into relative sliding engagement in a longitudinal keyway 72 in the secondary detent 66 for preventing its detachment from the primary detent 60 while allowing its longitudinal movement relative to the primary detent within limits. Compression springs 74, one seen, act between slide 52 and primary detent 60 to urge the latter into positive engagement with the gripping jaw shoe portion 56. Another compression spring 76 acts between slide 52 and secondary detent 66 to urge the latter also into positive engagement with the gripping jaw shoe portion 56.

Thus, as long as the primary detent 60 is sprung into toothed engagement with the gripping jaw shoe portion 56, the locking mechanism 58 remains in effect to lock the gripping jaw 32 onto the opposed slide 52. When thus locked onto the slide 52, the gripping jaw 32 moves therewith along one of the jaw guideways 54 relative to the chuck body 30. The secondary detent 66 functions to yieldably hold the gripping jaw 32 on the chuck body 30 upon disengagement of the primary detent 60 from the jaw, as will be explained later in more detail.

Provided for the desired radial motion of the gripping jaws 32 with the slides 52, as for chucking and unchucking work, is a wedge member 78 mounted centrally in the chuck body 30 for sliding movement in its axial direction. The wedge member 78 has a plurality of, three in this embodiment, undercut grooves 80 extending at an angle to the axis of the chuck. Each slide 52 has a T sectioned wedge portion 82 slidably engaged in one angled undercut groove 80 in the wedge member 78. The wedge member 78 is fastened at 84 to a conventional actuating mechanism comprising a rotary actuator 86, FIG. 1, thereby to be moved back and forth axially of the chuck 28. The bidirectional axial movement of the wedge member 78 results, of course, in the radially inward or outward movement of the slides 52 and therefore of the gripping jaws 32 along the radial jaw guideways 54.

The gripping jaws 32 must be unlocked from the slides 52 and withdrawn out of the jaw guideways 54 in the chuck body 30 for a change with some other set of gripping jaws 32' on the jaw magazine 34. Toward this end an unlocking pin 88 is slidably mounted in each slide 52. Movable radially of the chuck, the unlocking pin 88 has an inclined surface for sliding engagement with a correspondingly inclined surface of the primary detent 60. The contacting inclined surfaces of the primary detent 60 and unlocking pin 88 are such that upon forced depression of the unlocking pin into the slide 52, the primary detent travels rearwardly against the bias of the compression springs 74 out of engagement with the associated gripping jaw shoe portion 56, thereby unlocking the gripping jaw from the slide. The unlocking pin 88 upon forced depression into the slide 52 partly enters a recess 90 in the wedge member 78. When thrusted forwardly, the wedge member 78 pushes the unlocking pin 88 out of the recess 90, allowing the primary detent 60 to be sprung back into positive engagement with the gripping jaw shoe portion 56.

Disengaged from the primary detent 60 by the depression of the unlocking pin 88 as above, the gripping jaw 32 is still held in position on the chuck body 30 by the secondary detent 66, the latter being held in engagement with the gripping jaw under the relatively light force of the compression spring 76. However, the gripping jaw 32 is movable radially of the chuck body 30 against the force of the compression spring 76 upon application of an external force as by the jaw transfer mechanism 36.

The quick change chuck 28 of the foregoing construction rotates with the work spindle 26 under the control of the numerical control system or "director", not shown, of the N/C lathe 22. The "director" stops the rotation of the chuck 28 in predetermined angular positions where one of the radial jaw guideways 54 in the chuck body 20 is in what is herein called a jaw change position, designated A in FIGS. 1, 2 and 4. Jaw transfer between chuck 28 and jaw magazine 34 is to be effected while each jaw guideway 54 is in this jaw change position A. In the illustrated embodiment the jaw change position A of each jaw guideway 54 is vertically upward of the chuck axis since the jaw change assembly 44 is mounted on the top of the headstock 24 of the lathe 22. It will therefore be apparent that the jaw change position of the jaw guideways 54 may be in any other direction about the chuck axis depending upon the angular position of the jaw change assembly 44 on the machine tool about the chuck axis.

Longitudinal Transport Mechanism

Reference is directed to FIGS. 1, 3 and 4 for a description of the longitudinal transport mechanism 46 reciprocably moving the jaw change assembly 44 longitudinally of the work spindle 26. Included is a carriage 92 carrying the jaw change assembly 44 via the radial transport mechanism 48. The carriage 92 is slidably mounted on the headstock 24 for linear reciprocation along guide means 94 between the rear position of FIG. 1 and the front position of FIG. 2. Rigidly mounted on the headstock 24, a fluid actuated, double acting cylinder 96 has a piston rod 98 coupled to the carriage 92 via an L-shaped member 100 to cause such travel thereof. This cylinder will be referred to as the longitudinal cylinder hereafter by way of distinction from other cylinders to be set forth subsequently.

A stud bolt 102 is rigidly anchored at one end of the L-shaped member 100 on the carriage 92 and extends parallel to the longitudinal cylinder 96. A flange 104 on the rod end of the longitudinal cylinder 96 has a bore 106 to allow the stud bolt 102 to extend slidably therethrough. A pair of stop nuts 108 and 110 are threadedly mounted on the stud bolt 102, in the vicinities of its opposite ends, and are locked against axial displacement. Accordingly, with the extension and contraction of the longitudinal cylinder 96, its flange 104 moves into abutment against the stop nuts 108 and 110 to stop the carriage 92 in the exact front and rear positions.

Radial Transport Mechanism

A study of FIG. 1 will make clear the construction of the radial transport mechanism 48 which moves the jaw change assembly 44 up and down on the carriage 92. The radial transport mechanism includes an upstanding, hollow column 112 mounted on the carriage 92 and secured thereto as by screws 114. The axis of this hollow column 112 crosses the axis of the work spindle 26, or of the chuck 28 thereon, at right angles. The hollow column 112 has a fluid actuated, double acting cylinder 116, hereinafter referred to as the radial cylinder, threadedly and coaxially engaged at 118 in its top end. The piston rod 120 of the radial cylinder 116 extends upwardly therefrom.

Slidably fitted over the column 112 on the carriage 92 is a hollow magazine spindle 122 which is movable up and down with the jaw change assembly 44 but which is restrained from angular displacement relative to the column 112. The magazine spindle 122 has a sot 124 defined longitudinally therein for slidably receiving a key 126 protruding laterally from the column 112. The key 126 allows the up and down motion of the magazine spindle 122 but prevents its rotation relative to the column 112.

The piston rod 120 of the radial cylinder 116 has a threaded upward extension 128 of reduced diameter extending through a cap 130 and projecting upwardly therefrom. A locknut 132 is fitted over this projecting end of the piston rod extension 128 to hold the cap 130 fast against the piston rod 120. The cap 130 is threadedly engaged in a tubular, flanged retainer 134 which is itself threadedly engaged in the top end of the hollow magazine spindle 122.

It is now apparent that the magazine spindle 122 travels up and down with the extension and contraction of the radial cylinder 116. The jaw magazine 34 is rotatably mounted on this magazine spindle 122 whereas the other components of the jaw change assembly 44, such as the magazine indexing mechanism 35 and jaw transfer mechanism 36, are nonrotatably mounted thereon. With the extension and contraction of the radial cylinder 116, therefore, the complete jaw change assembly 44 moves between the upper position of FIG. 1 and the lower position of FIG. 2. How the magazine 122 supports the listed components of the jaw change assembly 44 will become apparent as the description progresses.

Jaw Magazine

Figure 6:
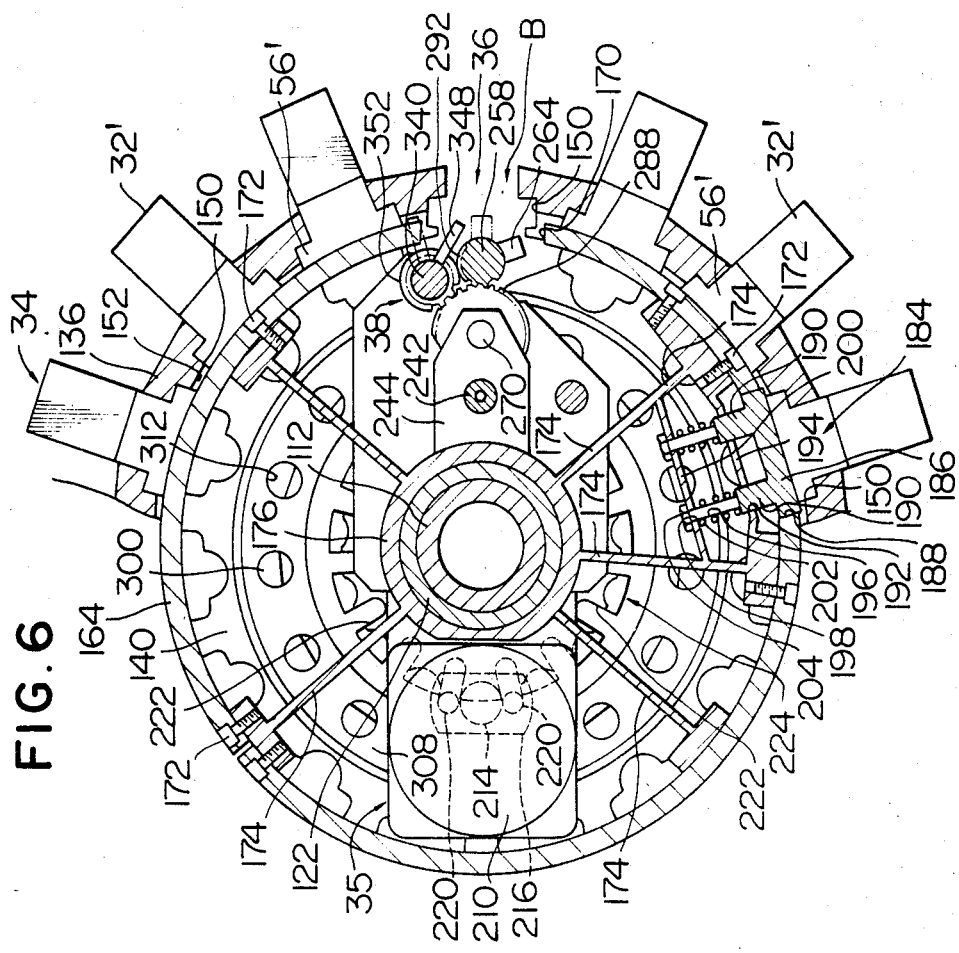
FIG. 6 is a section taken along the line VI—VI in FIG. 1 and showing in particular the jaw magazine together with the magazine indexing mechanism, jaw transfer mechanism, and retractable retainer assembly disposed internally of the jaw magazine.

The rotary, indexing jaw magazine 34 appears in all of FIGS. 1 through 4 and also in FIG. 6, the latter figure showing the jaw magazine in a horizontal section taken along the line VI—VI of FIG. 1. The construction of the jaw magazine 34 will be understood from a consideration of only FIGS. 1, 4 and 6. It will be observed from these figures that the jaw magazine 34 takes the form of an upstanding, hollow cylinder or drum 136 concentric with the magazine spindle 122 and therefore with the column 112. The cylindrical jaw magazine has a top 138 and a bottom 140 closing its opposite ends. The magazine top 138 and bottom 140 have bores 142 and 144 defined centrally therethrough to rotatably receive the hollow magazine spindle 122 as in FIG. 1. The magazine bottom 140 bears against a flange 146 on the bottom end of the magazine spindle 122 via a thrust beaing 148. The tubular flanged retainer 134, set forth in connection with the radial transport mechanism 48, has its flange slidably held against the magazine top 138 to prevent the upward displacement of the jaw magazine relative to the magazine spindle 122 which is moved up and down by the radial cylinder 116. Accordingly the jaw magazine 34 is both rotatable and movable vertically with respect to the carriage 92.

As best seen in FIGS. 4 and 6, the jaw magazine 34 has a plurality of, fifteen in the illustrated embodiment, undercut jaw grooves 150 defined therein so as to extend parallel to its axis at constant circumferential spacings and throughout the axial dimension of the jaw magazine. Each jaw groove 150 slidably receives the shoe portions 56' of one set of gripping jaws 32', or the shoe portions 56 of the set of gripping jaws 32 now shown mounted on the chuck body 30. The length of each jaw groove 150 must be sufficient to hold one set of gripping jaws in alignment.

The exemplified quick change chuck 28 is of three jaw construction, and the exemplified jaw changer 20 is intended to allow the chuck to make interchangeable use of fifteen sets of gripping jaws 32 and 32'. Thus the jaw magazine 34 holds forty-five gripping jaws at the maximum.

The jaw magazine 34 is to be revolved by the indexing mechanism 35 to bring any of its jaw grooves 150 into line with that one of the jaw guideways 54 in the chuck body 30 which is in the jaw change position A, when the complete jaw change assembly 44 is in the working position as in FIG. 2. This particular angular position of each jaw guideway 54 is hereinafter referred to as the second jaw change position in contradistinction from the first recited jaw change position A of the jaw guideways in the chuck body. The second jaw change position is indicated at B in FIGS. 4 and 6. Jaw change between a jaw guideway in the chuck body and a jaw groove in the jaw magazine is to be effected with that jaw guideway held in the first jaw change position, with that jaw groove in the second jaw change position, and of course with the jaw change assembly in the working position.

FIG. 1 reveals a set of two annular recesses 152 and 154 and another set of three annular recesses 156, 158 and 160 cut in the inside surface of the jaw magazine 34 at vertical or axial spacings so as to cross the jaw grooves 150 at right angles. The first set of annular recesses 152 and 154 are disposed at the lower ends of the shoe portions 56' (or 56) of the topmost and middle rows of gripping jaws 32' (or 32) on the jaw magazine 34. The second set of annular recesses 156, 158 and 160 are disposed on a level with notches 162 in the shoe portions 56' (or 56) of the three rows of gripping jaws 32' (or 32) on the jaw magazine 34. The reasons for the provision of this secnd set of recesses will become apparent from the subsequent description of the jaw transfer mechanism 36 and retractable retainer assembly 38.

The first set of recesses 152 and 154 receive with clearance annular jaw rests 164 and 166 respectively. Another annular jaw rest 168 is disposed just below the jaw magazine 134. Arranged concentrically with the jaw magazine 34 and nonrotatably supported by means hereinafter set forth, the three annular jaw rests 164, 166 and 168 hold thereon the sets of gripping jaws 32' (and 32) engaged in the jaw grooves 150 by making relatively sliding contact with the bottom ends of their shoe portions 56' (and 56). The gripping jaws are to slide over the jaw rests 164, 166 and 168 with the rotation of the jaw magazine 34. As indicated at 170 in FIG. 6, all these jaw rests are cut off in the second jaw change position B of the jaw grooves 150 for the passage of the gripping jaws 32' being transferred to the chuck body 30, or of the gripping jaws 32 being transferred from the chuck body. In this second jaw change position the retractable retainer assembly 38 functions to temporarily support the gripping jaws 32' to be transferred to the chuck body 30, as well as the gripping jaws 32 transferred from the chuck body, thereby preventing them from falling through the breaks 170 in the jaw rests 164, 166 and 168.

FIGS. 1 and 6 also illustrate the means for supporting the three jaw rests 164, 166 and 168. The upper two jaw rests 164 and 166 are each affixed as by screws 172 to the distal ends of a plurality of support arms 174 proximally anchored to a mounting sleeve 176 which is fitted over the hollow magazine spindle 122. The mounting sleeve 176 is locked against rotation relative to the magazine spindle 122 by two keys 178 and against axial displacement by a locknut 180. Consequently the mounting sleeve 176 with the upper two jaw rests 164 and 166 is nonrotatable but is movable up and down with the jaw magazine 34. The lowermost jaw rest 168 is bracketed at 181 to the bottom flange 146 of the magazine spindle 122, so that the lowermost jaw rest is in fixed relation to the upper two jaw rests 164 and 166.

The vertical positions of the three jaw rests 164, 166 and 168 must be so determined in relation to one another and to the chuck 28 that, when the jaw change assembly 44 is in the working position as in FIG. 2, the set of gripping jaws 32' in the second jaw change position B and the gripping jaw 32 in the first jaw change position A may be held at constant pitch distances P, as indicated in FIG. 2. The pitch distance P should be a minimum required for holding each set of gripping jaws 32' on the jaw magazine 34 without mutual interference, in order to minimize the axial dimension of the jaw magazine. However, since the chuck 28 lies some distance below the top of the carriage 92 on the lathe headstock 24, the pitch distance between the gripping jaw 32 in the first jaw change position A and the lowermost gripping jaw 32' in the second jaw change position B cannot possibly be reduced indifinitely, for, should this pitch distance be made too small by lowering the position of the lowermost jaw rest 168, the carriage 92 would interfere with the gripping jaws 32' on this lowermost jaw rest.

The only practical solution to the above problem is the sloping of the lowermost jaw rest 168. As indicated at 182 in FIG. 1, the top edge of the lowermost jaw rest 168 slopes downwardly as it extends toward its opposite extremities bounding the part where it is cut off, as at 170 in FIG. 6, in the second jaw change position B. This makes it possible to position each gripping jaw on the lowermost jaw rest 168 sufficiently close to the chuck 28 without the possibility of the jaw hitting the carriage 92 while being revolved with the jaw magazine 34.

The jaw magazine 34 is further provided with means designed to facilitate the manual engagement of the gripping jaws 32' into and out of engagement in the jaw grooves 150. Three such means are provided for the respective jaw rests 164, 166 and 168. Since the three means can all be identical in construction, only those for the topmost jaw rest 164 are illustrated in FIG. 6 and generally designated 184. The representative means 184 include a retractable bridge 186 fitted in a discontinuity 188 in the jaw rest 164 for movement in its radial direction. The position of the discontinuity 188 in the jaw rest 164 could be anywhere opposite one of the jaw grooves 150 in the jaw magazine 34, except the second jaw change position B. Normally the retractable bridge 186 slightly intrudes into the opposed jaw groove 150 and has its top edge flush with the top edge of the jaw rest 164. As long as being held in the illustrated normal position, the retractable bridge 186 allows one gripping jaw 32' to rest thereon, or the topmost row of gripping jaws 32' to slide thereover, just as if the jaw rest 164 had no such discontinuity.

Projecting radially inwardly from the retractable bridge 186 are a pair of bosses 190 slidably extending through respective openings 192 in a guide 194 formed integral with, and between, the two neighboring ones of the radial support arms 174 holding the jaw rest 164. A pair of stems 196 further extend radially inwardly from the respective bosses 190 and slidably engaged in bores 198 in another guide 200 also formed integral with, and between, the two neighboring ones of the support arms 174. Surrounding each stem 196, a compression spring 202 acts between bridge 186 and guide 200 to bias the former radially outwardly of the jaw rest 164. A head 204 on each stem 196 abuts against the guide 200 to limit the radially outward motion of the bridge 186 and to normally hold the same in the illustrated position.

The retractable bridge 186 may therefore be pressed radially inwardly against the forces of the compression springs 202 for mounting a gripping jaw 32' in the jaw grooves 150. The bridge will spring back when subsequently released from the pressure, allowing the gripping jaw 32' to rest thereon. While holding the shoe portion of any gripping jaw thereon, the retractable bridge 186 has its lower end portion projecting beyond the bottom of the gripping jaw. For dismounting the gripping jaw, therefore, this projecting lower end portion of the bridge is manually pressed inwardly to move the bridge out of engagement with the jaw.

Magazine Indexing Mechanism

Figure 7:
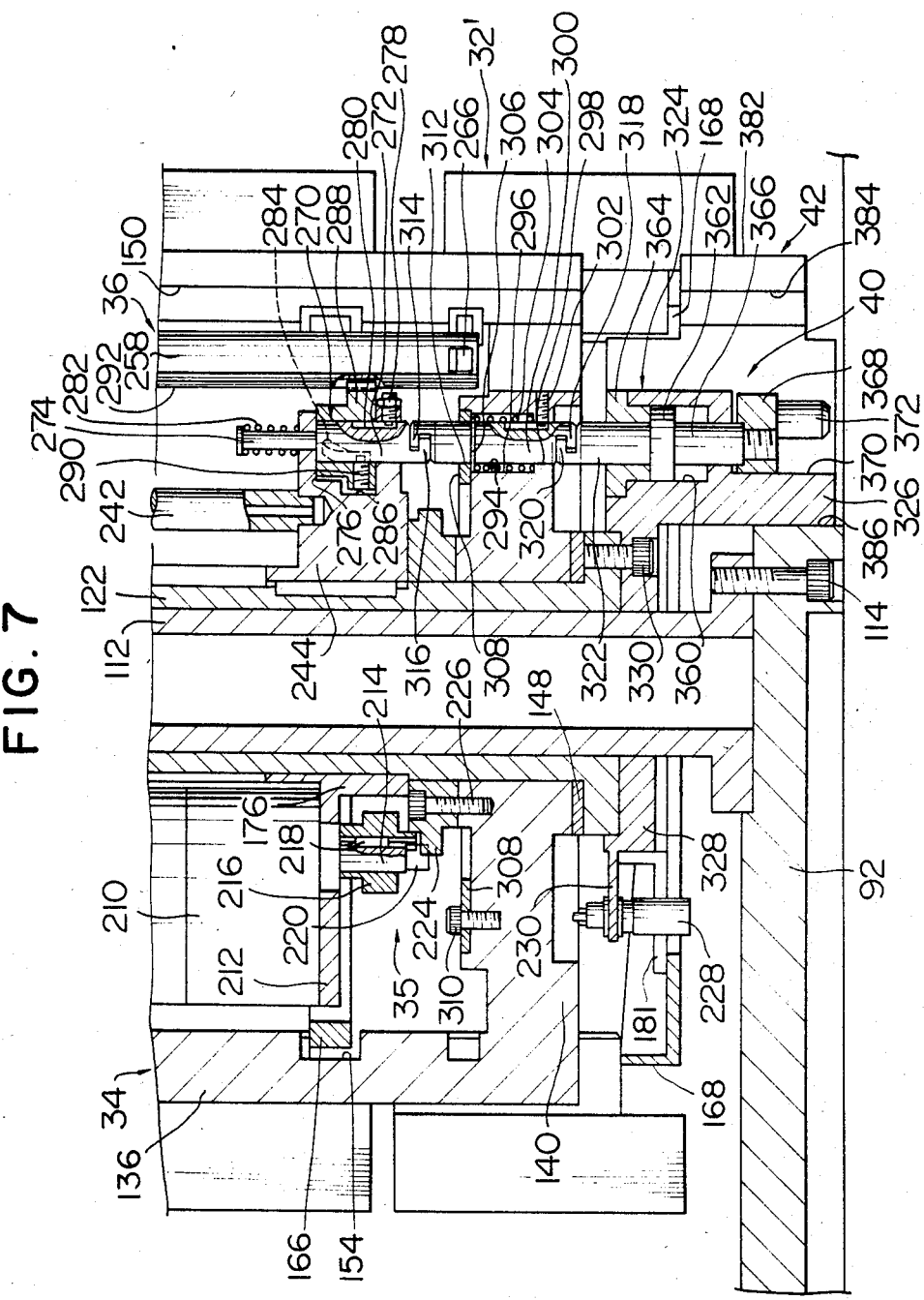
FIG. 7 is an enlarged, fragmentary vertical section through the jaw change assembly, showing in particular the magazine indexing mechanism, jaw transfer mechanism, and unlocking mechanism which are all built into the jaw magazine.

Reference may be had to FIGS. 6 and 7 for the details of the indexing mechanism 35 for the jaw magazine 34 although it is shown also in FIGS. 1 and 2. The magazine indexing mechanism 35 includes an indexing motor 210 for intermittently driving the jaw magazine 34 by means of a Geneva movement set forth hereafter. The indexing motor 210 is mounted on a bracket 212 secured to the mounting sleeve 176 around the hollow magazine spindle 122. The output shaft 214 of the indexing motor 210 has a rotor 216 keyed thereto at 218. The rotor 216 carries on its underside a pair of drive cams or pins 220 in positions of symmetry with respect to the axis of the motor output shaft 214. The drive cams 220 are movable into and out of engagement in a series of slots 222 cut in the periphery of a Geneva wheel 224 which is rotatably fitted over the mounting sleeve 122 and which is screwed at 226 to the bottom 140 of the jaw magazine 34 for joint rotation therewith. The slots 222 of the Geneva wheel 224 are arranged at constant angular spacings, with their angular positions corresponding to those of the jaw grooves 150 in the jaw magazine 34.

Thus, upon rotation of the motor output shaft 214 through an angle of 180 degrees in either direction from its FIG. 6 position, one of the drive cams 220 becomes engaged in one of the slots 222 in the Geneva wheel 224 and turns the same through a unit angle. The unit angle of rotation of the Geneva wheel 224, and therefore of the jaw magazine 34, is twenty four degrees in the present embodiment as the jaw magazine has fifteen jaw grooves 150 as aforesaid. Any of the jaw grooves 150 can thus be exactly placed in the second jaw change position B.

At 228 in FIG. 7 is shown a proximity switch, affixed to the magazine spindle 122 via a bracket 230, for terminating the rotation of the indexing motor 210 when any desired jaw groove 150 in the jaw magazine 34 reaches the second jaw change position. The promity switch 228 is to be activated by an annular row of idler rods (to be explained presently) which are associated with the respective jaw grooves 150 and which rotate with the jaw magazine 34.

The indexing motor 210 is also under the control of a jaw identifying switch assembly seen at 232 in FIG. 1. Bracketed at 234 to the mounting sleeve 176, the switch assembly 232 has four vertically spaced apart feeler arms 236 projecting therefrom in a radially outward direction of the jaw magazine 34. Arranged on the opposed inside surface portion of the jaw magazine 34 to selectively activate the feeler arms 236 are a set of switch actuators 238 characteristically associated with each jaw groove 150. The switch assembly 232 identifies each jaw groove from the number and vertical positions of the associated set of switch actuators 238.

Jaw Transfer Mechanism

With reference to FIGS. 1, 4, 6 and 7 the jaw transfer mechanism 36 is wholly disposed within the jaw magazine 34, in the immediate vicinity of the second jaw change position B, for the transfer of the gripping jaws 32 from chuck body 30 to jaw magazine 34, and of the gripping jaws 32' from jaw magazine to chuck body.

The jaw transfer mechanism 36 includes a fluid actuated, double acting, double ended rod cylinder 240 (hereinafter referred to as the transfer cylinder) generally extending parallel to the magazine spindle 122. The transfer cylinder 240 has a piston rod 242 extending downwardly therefrom and rigidly anchored to a bracket 244 on the mounting sleeve 176. Another piston rod 246 of the transfer cylinder 240, extending upwardly therefrom, is likewise anchored to another bracket 248 on the mounting sleeve 176. With its two piston rods 242 and 246 both rigidly supported by the mounting sleeve 176, the transfer cylinder 240 has only its cylinder body 250 moved up and down with the pressurization of its pair of opposed fluid chambers. The stroke of the transfer cylinder 240 is set equal to the pitch P, FIG. 2, of the gripping jaws 32 and 32' aligned in the first and second jaw change positions A and B.

The transfer cylinder 240 has a pair of support arms 252 projecting laterally therefrom. These support arms firmly support a sleeve bearing 254 in which there is rotatably received a reduced diameter journal portion 256 of a transfer rod 258 extending vertically along that one of the jaw grooves 150 in the jaw magazine 34 which is in the second jaw change position B. A locknut 260 locks the transfer rod 258 against axial displacement relative to the sleeve bearing 254. It is therefore apparent that the transfer rod 258 is both rotatable bidirectionally about its own axis and movable up and down with the transfer cylinder 240, with respect to the jaw magazine 34.

The transfer rod 258 has three protuberances 262, 264 and 266 formed in vertically and constantly spaced apart positions thereon and projecting laterally therefrom in the same direction. When the transfer rod 258 is held raised by the transfer cylinder 240 as in FIG. 1, its protuberances 262, 264 and 266 are on the same levels respectively with the notches 162 in the shoe portions 56' of the three gripping jaws 32' aligned in the second jaw change position B. The transfer rod protuberances 262, 264 and 266 are movable into engagement in the notches 162 of the three gripping jaws 36' as the transfer rod 258 is revolved by means set forth subsequently, for transferring them down to the chuck body 30 one after the other by the subsequent longitudinal reciprocation of the transfer rod. Further, when the transfer rod 258 is lowered by the transfer cylinder 240, the lowermost protuberance 266 thereon is engageable in the notch 162 of that gripping jaw 32 on the chuck body 30 which is being held in the first jaw change position A, for carrying the jaw up to the jaw magazine 34.

The topmost protuberance 262 on the transfer rod 258 is formed on its journal portion 256 received in the sleeve bearing 254. Thus the sleeve bearing 254 has formed therein a slot 268 to allow the topmost protuberance 262 to project outwardly therethrough and, with the bidirectional rotation of the transfer rod 258, to turn through an angle required for moving into and out of engagement in the notch 162 of the topmost gripping jaw 32' in the second jaw change position B.

The following means are provided for the bidirectional rotation of the transfer rod 258 about its own axis. As best seen in FIG. 7, the aforesaid bracket 244 on the mounting sleeve 176 has a cam rod 270 mounted thereto for longitudinal sliding motion in a direction parallel to the transfer rod 258. The cam rod 270 has a larger diameter portion 272 and a smaller diameter portion 274, with a shoulder 276 therebetween. A key 278 on the bracket 244 is slidably engaged in a keyway 280 in the larger diameter portion 272 of the cam rod 270 to prevent its angular displacement. A compression spring 282 around the smaller diameter portion 274 of the cam rod 270 biases the same upwardly of the bracket 244 and normally holds the cam rod in the illustrated position with its shoulder 276 butting on the bracket. The larger diameter portion 272 of the cam rod 270 has a cam groove 284 formed therein.

The bracket 244 is recessed at 286 to accommodate a sector gear 288 which is rotatably fitted over the larger diameter portion 272 of the cam rod 270. The sector gear 288 is rotatable relative to the bracket 244 but is thereby prevented from axial displacement relative to the same. Embedded in the sector gear 288, a cam follower pin 290 is slidably engaged in the cam groove 284 in the larger diameter portion 272 of the cam rod 270. The cam groove 284 is so contoured that the up and down motion of the cam rod 270 results in the bidirectional rotation of the sector gear 288. This sector gear has straight gear teeth in constant mesh with a series of gear teeth 292 cut longitudinally on the transfer rod 258 over approximately half its circumference.

Accordingly, with the up and down motion of the cam rod 270, the transfer rod 258 rotates bidirectionally about its own axis to move its protuberances 262, 264 and 266 between the solid line and phantom positions of FIG. 6. The transfer rod protuberances are in the solid line position, in which they are out of engagement with the gripping jaws, when the cam rod 270 is held raised under the bias of the compression spring 282 as in FIG. 7. Upon downward travel of the cam rod 270, the transfer rod protuberances 262, 264 and 266 turn to the phantom position to engage the gripping jaws. The downward travel of the cam rod 270 is effected by the following means.

As will be seen from both FIGS. 6 and 7, the bottom 140 of the jaw magazine 34 has formed therein a series of stepped bores 294 in annular arrangement about the axis of the jaw magazine. Having an upper, larger diameter portion 296 and a lower, smaller diameter portion 298, each bore 294 extends parallel to the axis of the jaw magazine 34. The angular positions of these bores correspond to those of the jaw grooves 150 in the jaw magazine 34. Each bore 294 receives an idler rod 300 which is slidable longitudinally in its smaller diameter portion 298 and which is prevented from rotation by a key 302. A compression spring 304 is sleeved upon each idler rod 300 and is received in the larger diameter portion of the bore 294. This compression spring acts between the magazine bottom 140 and a collar 306 on the idler rod 300 to bias the latter upwardly. In order to limit the upward motion of the idler rod 300, an annular abutment 308 is screwed at 310 to the magazine bottom 140 so as to close the top ends of all the stepped bores 294. The abutment is bored at 312 to allow each idler rod 300 to slidably extend upwardly therethrough. The collar 306 on the idler rod 300 is normally held against the abutment 312 by the force of the compression spring 304.

Each idler rod 300 has a hook 314 on its top end engageable with a complementary hook 316 on the bottom end of the aforesaid cam rod 270. The hooks 314 and 316 are so shaped and sized in relation to each other that they do not interfere with each other during the rotation of the jaw magazine 34. When the jaw magazine is set out of rotation, with one of its jaw grooves in the second jaw change position, the hook 314 of the idler rod 300 associated with that jaw groove engages the hook 316 of the cam rod 270. Upon interengagement of the hooks 314 and 316, the cam rod 270 is constrained to joint longitudinal displacement with the idler rod 300.

Each idler rod 300 has another hook 318 on its bottom end engageable with a complementary hook 320 on the top end of a piston rod 322 of a fluid actuated, double acting, double ended rod cylinder 324. This cylinder has a body 326 formed in one piece with a mounting flange 328. This mounting flange is screwed at 330 to the bottom flange 146 of the hollow magazine spindle 122, so that the cylinder 324 is therefore movable up and down with the jaw magazine 34 but is nonrotatable relative to the carriage 92.

Just like the hooks 314 and 316, the hooks 318 and 320 are made so not to interfere with each other during the rotation of the jaw magazine 34. When the jaw magazine comes to a stop with one of its jaw grooves in the second jaw change position, the hook 318 of the idler rod 300 associated with that jaw groove comes into engagement with the hook 320 of the piston rod 322. Upon subsequent contraction of the piston rod 322 into the cylinder body 326, the idler rod 300 is thereby lowered against the force of the compression spring 304 and so lowers the cam rod 270 against the force of the compression spring 282. The descent of the cam rod 270 results as aforesaid in the rotation of the transfer rod 258.

The cylinder 324 performs some important functions in addition to the rotary actuation of the transfer rod 258. The name "multipurpose cylinder" will therefore be given to this cylinder. Its additional functions and further details of construction will be set forth in the course of the subsequent description of the jaw transfer mechanism 38 and unlocking mechanism 40.

Retractable Retainer Assembly

Figure 8:
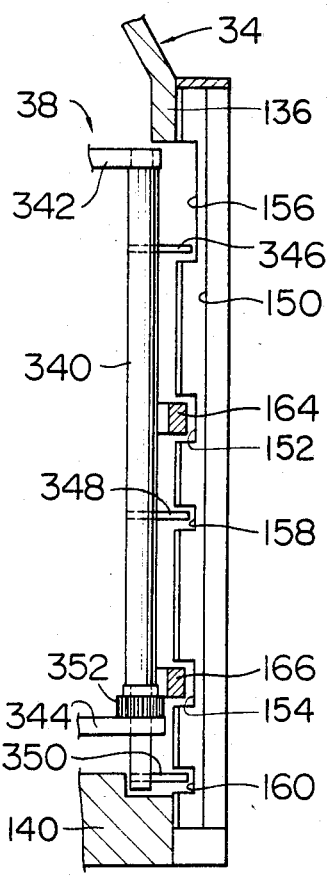
FIG. 8 is a fragmentary vertical section through the jaw magazine, showing in particular the retractable retainer assembly seen also in FIG. 6.

Closely associated with the jaw transfer mechanism 36 is the retractable retainer assembly 38 seen in part in FIGS. 1, 2, 4 and 6 but better shown in FIG. 8. The retainer assembly 38 is also wholly arranged within the jaw magazine 34. It includes a rotatable retainer shaft 340 disposed adjacent the second jaw change position B and extending along the transfer rod 258 of the jaw transfer mechanism 36. The retainer shaft 340 is rotatably supported by a pair of bearing members 342 and 344 affixed to the hollow mounting sleeve 176 and is thereby restrained from axial displacement.

Three retainer pins 346, 348 and 350 are embedded in the retainer shaft 340 at constant longitudinal spacings and project laterally therefrom in the same direction. These retainer pins are movable, with the bidirectional rotation of the retainer shaft 340, into and out of engagement with the respective gripping jaws 32' (or 32) in the second jaw change position B through the aforesaid internal annular recesses 156, 158 and 160, respectively, in the jaw magazine 34. FIG. 6 indicates the normal working position of the retainer pins 346, 348 and 350 by the solid lines and their retracted position. When any set of gripping jaws 32' are brought to the second jaw change position B by the rotation of the jaw magazine 34, the retainer pins in their solid line working position become engaged in the notches 162 in the jaws to prevent them from falling through the cutouts 170 in the jaw rests 164, 166 and 168. The retainer pins 346, 348 and 350 also function to similarly engage and temporarily hold the gripping jaws 32 that have been transferred from the chuck body 30, as will be later explained in further detail.

The retainer shaft 340 has a pinion 352 rigidly mounted thereon just above the lower bearing member 344. This pinion is in mesh with the sector gear 288 set forth in conjunction with the jaw transfer mechanism 36. It will be recalled that the sector gear 288 rotates bidirectionally with the up and down motion of the piston rod 322 of the multipurpose cylinder 324. This bidirectional rotation of the sector gear 288 is imparted directly to the retainer shaft 340, besides being similarly imparted to the transfer rod 258 of the jaw transfer mechanism 36, to cause the angular displacement of the three retainer pins 346, 348 and 350 between the working and retracted positions on FIG. 6. It will be appreciated that the transfer rod 258 and retainer shaft 340 are compelled to operate in exact synchronism with each other, being both driven from the same actuator via the same gear.

Unlocking mechanism

Figure 9:
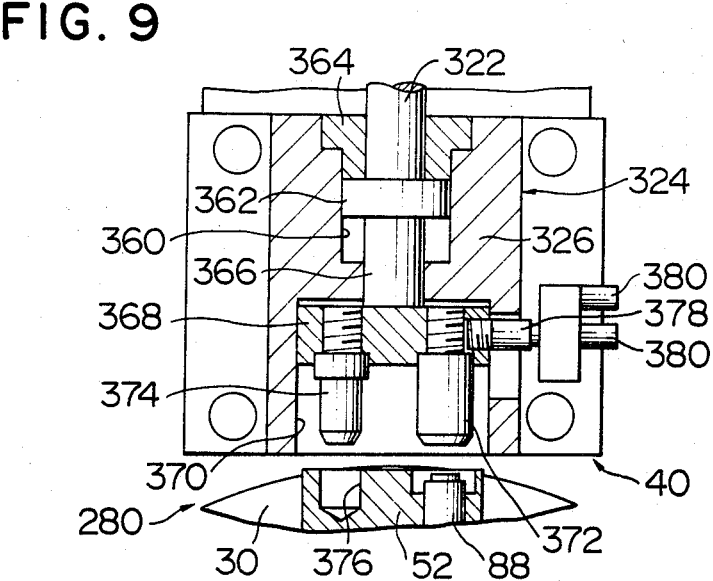
FIG. 9 is a section taken along the line IX—IX in FIG. 2 and showing in particular the unlocking mechanism together with those parts of the chuck which are associated with the unlocking mechanism.

Reference is directed to FIGS. 7 and 9 in particular for the detailed description of the unlocking mechanism 40, although it appears also in FIGS. 1, 2 and 4. The unlocking mechanism 40 functions to unlock the gripping jaw 32 in the first jaw change position A on the chuck body 30 preparatory to its transfer to the jaw magazine 34, by acting on the associated unlocking pin 88 of the chuck 28.

The primary component of the unlocking mechanism 40 is the noted multipurpose cylinder 324. The body 326 of this cylinder is bored at 360 to provide a piston chamber slidably receiving a piston 362. An end cap 364 pressure tightly closes the top end of the piston chamber 360. The piston 362 has the aforesaid piston rod 322 extending upwardly therefrom for selective engagement with the idler rods 300. Another piston rod 366 extends downwardly from the piston 362. The axis of the piston rods 322 and 366 is normal to the axis of the work spindle 26 or of the chuck 28 thereon.

Mounted on the bottom end of the multipurpose cylinder piston rod 366 is a pin carrier 368 which is slidably engaged in a recess 370 in the multipurpose cylinder body 326 and which is thereby constrained to only linear reciprocation toward and away from the chuck 28. The undesired rotation of the piston rod 322 is also prevented in this manner. The pin carrier 368 rigidly carries a push pin 372 extending downwardly therefrom. When the jaw change assembly 44 is in the working position of FIG. 2, the push pin 372 is held opposite the unlocking pin 88 of the chuck 28 associated with the gripping jaw 32 being held in the first jaw change position A.

Normally the multipurpose cylinder piston 362 is held raised as in FIGS. 7 and 9. Since then the pin carrier 368 is retracted in the multipurpose cylinder body recess 370, the push pin 372 allows the rotation of the chuck 28 even if the jaw change assembly 44 is in the working position. Upon descent of the piston 362, then, the push pin 372 engages and pushes the unlocking pin 88 into the associated slide 52 thereby causing the primary detent 60, FIG. 5, of the locking mechanism 58 to move out of toothed engagement with the gripping jaw 32 being held in the first jaw change position A.

The multipurpose cylinder 324 is further adapted to position the chuck 28 so as to hold any desired jaw guideway 54 in the chuck body 30 in the exact first jaw change position with respect to the jaw guide 42 of one piece construction with the multipurpose cylinder body 326. Toward this end is a positioning pin 374 affixed to the pin carrier 368 in side by side relation with the push pin 372. Each slide 52 of the chuck 28 has a positioning bore 376 defined in its radially outward end for receiving the positioning pin 374. When the jaw change assembly 44 is in the working position, the positioning pin 374 is held opposite the positioning bore 376 in the slide 52 associated with the gripping jaw 32 being held in the first jaw change position A. Like the push pin 372 the positioning pin 374 is held retracted in the multipurpose cylinder body recess 370 when the multipurpose cylinder piston 362 is in the raised position, so that the positioning pin 374 does not interfere with the rotation of the chuck 28. Upon descent of the piston 362 the positioning pin 374 becomes closely inserted in the associated positioning bore 376 to hold the chuck 28 exactly in the required angular position with respect to the jaw guide 42.

It will have been seen that the multipurpose cylinder 324 performs the following functions in the illustrated embodiment:

1. The rotary actuation of the transfer rod 258 of the jaw transfer mechanism 36.
2. The rotary actuation of the retainer shaft 340 of the retractable retainer assembly 38.
3. The unlocking of the gripping jaw 36 from the chuck body 30 in the first jaw change position A.
4. The positioning of the chuck body 30 relative to the jaw guide 42.

With reference directed further to FIG. 9 the pin carrier 368 has a support 378 secured thereto. This support has a pair of switch actuators 380 affixed thereto for activating limit switches, not shown, on the cylinder body 326. The unshown limit switches determine the upper and lower extremities of the multipurpose cylinder piston 362.

Jaw Guide

As will be seen from FIGS. 1, 2, 4 and 7, the jaw guide 42 is formed integral with the multipurpose cylinder body 326. The jaw guide has a pair of opposed guide walls 382 projecting forwardly (rightwardly as viewed in FIGS. 1, 2 and 7 and toward the viewer in FIG. 4) from the multipurpose cylinder body 326. The opposed guide walls 382 define in combination a guide track 384.

When the jaw change assembly 44 is in the working position as in FIG. 2, the guide track 384 serves as a substantially continuous, rectilinear path for the gripping jaws 32 and 32' between that one of the jaw guideways 54 in the chuck body 30 which is in the first jaw change position A and that one of the jaw grooves 150 in the jaw magazine 34 which is in the second jaw change position. The guide track 384 has the same cross sectional shape as each jaw guideway 54 in the chuck body 30 and each jaw groove 150 in the jaw magazine 34 for guiding the gripping jaws 32 and 32' with a high degree of accuracy. The opposite extremities of the guide track may be flared for the smooth entrance of the gripping jaws therein.

It will be observed from FIG. 7 that the multipurpose cylinder body 326 is slidably held against the front edge 386 of the carriage 92. Consequently, being integral with the multipurpose cylinder body 326, the jaw guide 42 is stably supported against displacement at least in a direction parallel to the work spindle 26 of the lathe 22.

OPERATION

The chuck jaw changer 20 of the above described construction operates as follows for changing the set of gripping jaws 32 now shown mounted on the chuck body 30 with one of the additional sets of gripping jaws 32' on the jaw magazine 34. As the unshown "director" of the N/C lathe 22 puts out a jaw change command, as for a change in work to be machined, the work spindle 26 responds by decelerating and automatically comes to a stop with one of the jaw guideways 54 in the chuck body 30 oriented vertically upwardly in the first jaw change position A. Then the rotary actuator 86 on the rear end of the headstock 24 operates to cause the forward movement of the wedge member 78 of the chuck 28. The result is the radially outward movement of the three gripping jaws 32 on the chuck body 30.

It is assumed that the jaw change assembly 44 has so far been held in the retracted position of FIG. 1. Now the jaw change assembly must be moved to the working position of FIG. 2. Toward this end the longitudinal cylinder 96 of the longitudinal transport mechanism 46 is first extended to move the carriage 92 to the front position together with the jaw change assembly 44 thereon. Then the radial cylinder 116 of the radial transport mechanism 48 is contracted to lower the jaw change assembly 44 as in FIG. 2. With the jaw change assembly thus placed in the working position, an empty jaw groove 150 in the jaw magazine 34 lies in the second jaw change position B. The jaw guide 42 is also positioned with its guide track 384 in line with the jaw guideway 54 in the first jaw change position A and with the jaw groove 150 in the second jaw change position B.

The jaw magazine 34 has the additional sets of gripping jaws 32' mounted in all but one of the fifteen jaw grooves 150 by making use of the retractable bridges 186, FIG. 6, in the discontinuities of the jaw rests 164, 166 and 168. The jaw magazine 34 may be indexed by the indexing mechanism 35 to bring the one empty jaw groove to the second jaw change position B, either before or after the jaw change assembly 44 is moved to the working position as above. Generally, however, the jaw groove 150 from which the set of gripping jaws has previously been transferred to the chuck body 30 may be held in the second jaw change position to accept the same jaw set.

Figure 10:
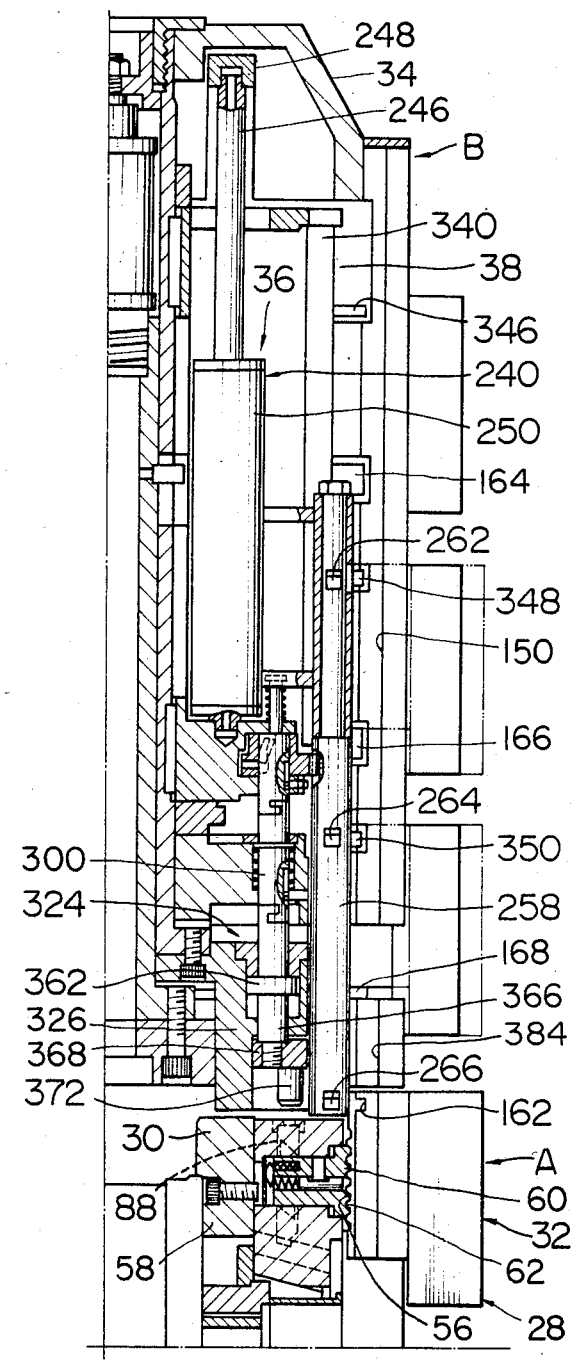
FIG. 10 is a fragmentary vertical section through the chuck jaw changer of FIG. 1, shown in a step in its operation.

Then the transfer cylinder 240 of the jaw transfer mechanism 36 is activated to lower the cylinder body 250 a distance equal to the pitch P of the gripping jaws 32 and 32' aligned in the first and second jaw change positions A and B. FIG. 10 shows the transfer cylinder body 250 thus lowered. Rigidly coupled to this transfer cylinder body, the transfer rod 258 descends therewith the same distance. The three protuberances 262, 264 and 266 on the transfer rod 258 are also arranged with the pitch P, so that the lowermost protuberance 266 is now on the same level with the notch 162 in the gripping jaw 32 being held in the first jaw change position A on the chuck body 30. The other two protuberances 262 and 264 are on the same levels with the middle and lowermost retainer pins 348 and 350, respectively, on the retainer shaft 340 of the retractable retainer assembly 38. The multipurpose cylinder 324 has still its piston 362 held raised, so that the protuberances 262, 264 and 266 on the transfer rod 258 are in the solid line position of FIG. 6, with the lowermost protuberances 266 out of engagement with the gripping jaw 32 in the first jaw change position A.

Figure 11:
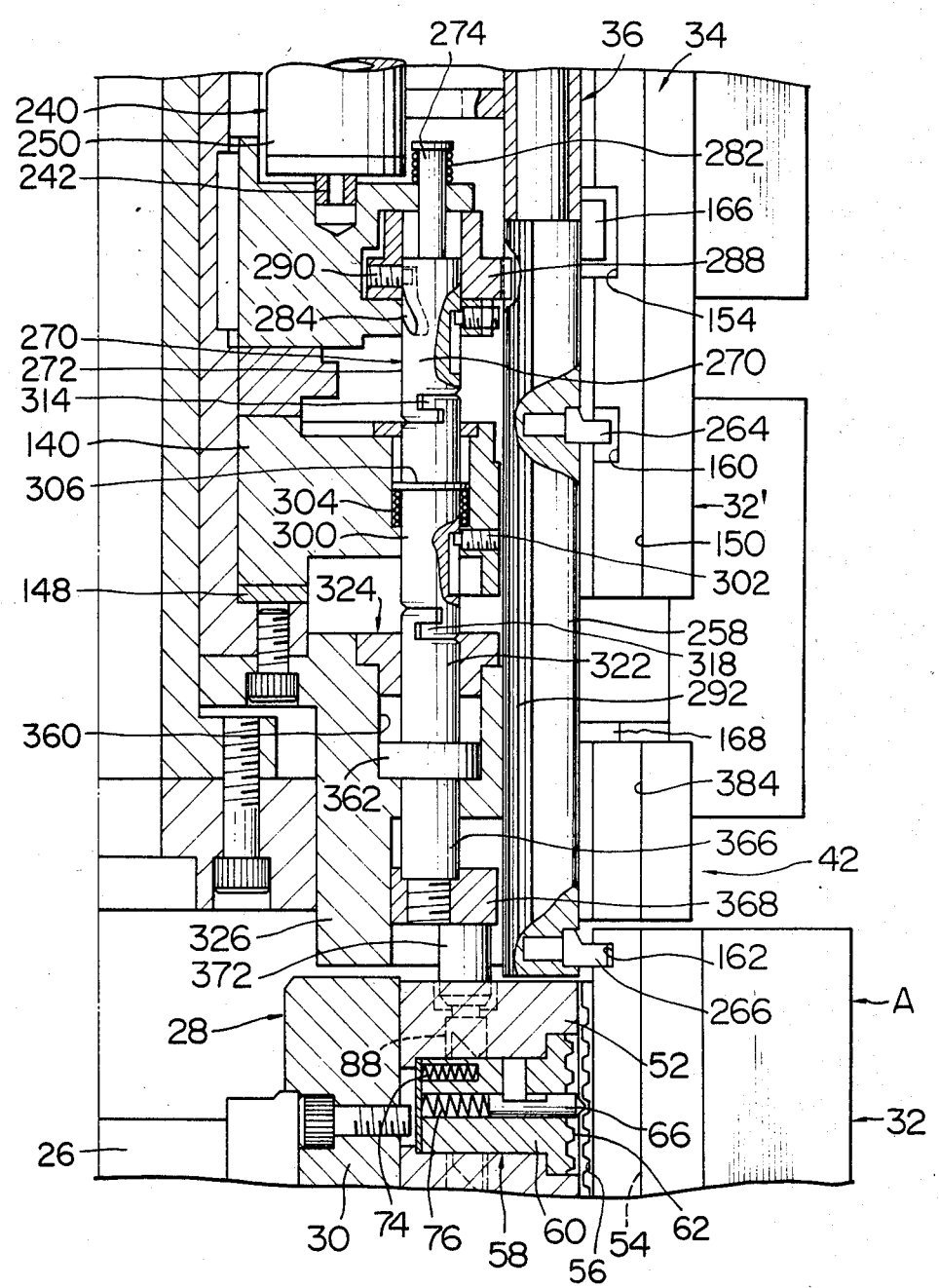
FIG. 11 is an enlarged, fragmentary vertical section through the chuck jaw changer, shown in another step in its operation.

Then the multipurpose cylinder 324 has its piston 362 lowered as in FIG. 11 to perform the above enumerated four functions. First of all, upon descent of the multipurpose cylinder piston 362, the push pin 372 on the pin carrier 368 on its lower piston rod 366 engages and pushes that unlocking member 88 of the chuck 28 which is associated with the gripping jaw 32 being held in the first jaw change position A. The pushing of the unlocking member 88 results in the retraction of the primary detent 60 of the associated locking mechanism 58 against the force of the compression springs 74, out of positive engagement with the gripping jaw 32 in the first jaw change position A. This gripping jaw is now free to be withdrawn from the chuck body 30. However, the secondary detent 66 of the locking mechanism 58 is still engaged with the gripping jaw 32 under the bias of the compression spring 76, preventing the jaw from slipping down the jaw guideway 54. The secondary detent 66 yields as aforesaid when the gripping jaw 32 is subsequently forced upwardly by the jaw transfer mechanism 36.

Also, upon descent of the multipurpose cylinder piston 362, the positioning pin 374 on the pin carrier 368 becomes engaged in the positioning hole 376 in that slide 52 of the chuck 28 which is associated with the gripping jaw 32 being held in the first jaw change position A. The position pin 374 thus positions the slide 52, and therefore the chuck body 30, with respect to the jaw guide 42 integral with the multipurpose cylinder body 326. That jaw guideway 54 in the chuck body 30 which is in the first jaw change position A is now exactly in line with the guide track 384 defined by the jaw guide 42.

The descent of the multipurpose cylinder piston 362 results further in the rotary activation of the jaw transfer mechanism 36 and retractable retainer assembly 38. The upper piston rod 322 of the multipurpose cylinder 324 has been hooked onto that one of the idler rods 300 on the jaw magazine bottom 140 which is associated with the empty jaw groove 150 now in the second jaw change position B. This idler rod 300 has been further hooked onto the cam rod 270. Consequently, upon descent of the multipurpose cylinder piston 362, the idler rod 300 lowers against the force of the compression spring 304, lowering in turn the cam rod 270 against the force of the compression spring 282. This descent of the cam rod 270 results in the rotation of the sector gear 288 in a clockwise direction, as viewed in FIG. 6, via the cam follower pin 290 slidably engaged in the cam groove 284 in the cam rod. Directly in mesh with the sector gear 288, the transfer rod 258 of the jaw transfer mechanism 36 rotates counterclockwise, as seen also in FIG. 6, with the result that the three protuberances 262, 264 and 266 on the transfer rod move from the solid line retracted position of FIG. 6 to the phantom working position. The transfer rod 258 has been lowered. With its counterclockwise rotation, therefore, the lowermost protuberance 266 thereon moves into engagement in the notch 162 in the gripping jaw 32 in the first jaw change position A, as illustrated in FIG. 11. The other two protuberances 262 and 264 on the transfer rod 258 serve no useful purpose at this time as there is no gripping jaw in the second jaw change position B.

Also in mesh with the sector gear 288 via the pinion 352 thereon, the retainer shaft 340 of the retractable retainer assembly 38 likewise rotates counterclockwise, as viewed in FIG. 6, upon clockwise rotation of the sector gear. Thereupon the three retainer pins 346, 348 and 350 turn from the solid line working position of FIG. 6 to the phantom retracted position and so retract away from the jaw groove 150 in the second jaw change position B.

The gripping jaw 32 in the first jaw change position A is now ready for transfer from chuck body 30 to jaw magazine 34. The transfer cylinder 240 is reactivated to cause the ascent of its body 250 back to its initial position of FIGS. 1 and 2 together with the transfer rod 258 coupled thereto. FIG. 12 shows the transfer rod 258 thus raised with the gripping jaw 32 in engagement with the lowermost protuberance 266 thereon. Withdrawn from the jaw guideway 54 in the chuck body 30 by the ascending transfer rod 258, the gripping jaw will smoothly enter the guide track 384 defined by the jaw guide 42 and will thereby be accurately directed into the empty jaw groove 150 in the jaw magazine 34 in the second jaw change position B. The gripping jaw 32 will stop with its notch 162 on a level with the lowermost retainer pin 350 on the retainer shaft 340 now held retracted. This lowermost retainer pin is to engage and hold the gripping jaw 32 upon subsequent retraction of the lowermost protuberance 266 out of engagement in its notch 162.

Then the multipurpose cylinder piston 362 is raised as in FIG. 13. Thereupon the push pin 372 on the multipurpose cylinder piston rod 366 releases the unlocking member 88, thereby allowing the associated primary detent 60, and therefore the unlocking member itself, to spring back to their normal positions. The positioning pin 374 on the multipurpose cylinder piston rod 366 also withdraws out of the positioning hole 376 in the chuck slide 52.

Further, with the ascent of the multipurpose cylinder piston 362, its piston rod 322 raises the cam rod 270 back to its initial position via one of the idler rods 300. The ascending cam rod 270 turns the sector gear 288 in a clockwise direction, as viewed in FIG. 6, via the cam follower pin 290 slidably engaged in the cam groove 284. The result is the clockwise rotation of both transfer rod 258 and retainer shaft 340. With the clockwise rotation of the transfer rod 258, the three protuberances 262, 264 and 266 thereon all move away from the jaw groove 150 in the second jaw change position B. Thus the lowermost protuberance 266 moves out of engagement in the notch 162 in the gripping jaw 32. This gripping jaw does not fall from the jaw magazine 34, however, as the retainer shaft 340 revolves clockwise at the same time with the transfer rod 258. Just before the lowermost protuberance 266 on the transfer rod leaves the gripping jaw notch 162, the lowermost retainer pin 350 on the retainer shaft 340 becomes engaged therein. The lowermost retainer pin holds the gripping jaw on the jaw magazine 34 after the lowermost protuberance 266 has disengaged the same, as illustrated in FIG. 13.

Then the work spindle 26 of the N/C lathe 22 is automatically turned through a preassigned angle to bring the second gripping jaw on the chuck body 30 to the first jaw change position A.

Then the transfer cylinder body 250 is lowered again together with the transfer rod 258 coupled thereto until the lowermost protuberance 266 thereon reaches the position on a level with the notch 162 in the second gripping jaw 32, as has been set forth with reference to FIG. 10 in connection with the first gripping jaw that has been transferred as above to the jaw magazine 34. The middle protuberance 264 on the transfer rod 258 is now on a level with the first gripping jaw 32 being held by the lowermost retainer pin 350 in the jaw groove 150 in the jaw magazine 34.

Then the multipurpose cylinder piston 362 is lowered again. As has been described with reference to FIG. 11 the descent of the multipurpose cylinder piston 362 results in the unlocking of the second gripping jaw 32 from the primary detent 60 of the associated locking mechanism 58, and in the positioning of the chuck body 30 with respect to the jaw guide 42. Further the transfer rod 258 and retainer shaft 340 are both revolved counterclockwise as viewed in FIG. 6. Thereupon the lowermost protuberance 266 on the transfer rod 258 becomes engaged in the notch 162 in the second gripping jaw 32 on the chuck body 30, whereas the middle protuberance 264 thereon becomes engaged in the notch 162 in the first gripping jaw 32 being held in the lowermost position on the jaw magazine 34 as the lowermost retainer pin 350 on the retainer shaft 340 moves out of engagement with the first gripping jaw.

Then the transfer cylinder 240 is reactivated to cause the ascent of its body 250 together with the transfer rod 258. Having its lower two protuberances 264 and 266 engaged with the first and second gripping jaws 32, the transfer rod 258 moves the second jaw from the chuck body 30 to the lowermost position on the jaw magazine 34, and the first jaw from the lowermost to the middle position on the jaw magazine.

The third gripping jaw 32 can likewise be transferred from chuck body 30 to jaw magazine 34. The complete set of gripping jaws thus transferred onto the jaw magazine 34 are aligned in the jaw groove 150 in the second position B just like all the other sets of gripping jaws 32' in the other jaw grooves in the jaw magazine.

Following the transfer of the final gripping jaw 32 from chuck body 30 to jaw magazine 34 by the transfer rod 258, the multipurpose cylinder piston 362 is raised to cause the push pin 52 to release the unlocking member 88, and to cause withdrawal of the positioning pin 374 from the positioning hole 376. Further the transfer rod protuberances 262, 264 and 266 are moved out of engagement with the three gripping jaws 32 that have been transferred to the jaw magazine 34; instead, the retainer pins 346, 348 and 350 are moved into engagement with the gripping jaws for holding them in position on the jaw magazine until the latter is set into rotation by the magazine indexing mechanism 35.

Next comes the step of transferring a desired new set of gripping jaws 32' from jaw magazine 34 to chuck body 30. The desired set of gripping jaws must first be moved to the second jaw change position B. The magazine indexing mechanism 35 is set into operation to revolve the jaw magazine 34 about the hollow magazine spindle 122. During such rotation of the jaw magazine 34 the jaw identifying switch assembly 232 senses the approach to the second jaw change position B of that jaw groove 150 which has the desired set of gripping jaws engaged therein. Then, as the proximity switch 228 senses the arrival of that jaw groove at the second jaw change position B from the associated idler rod 300, the indexing motor 210 is automatically set out of rotation. Now the desired set of gripping jaws 32' are set in the second jaw change position B by being supported by the respective retainer pins 346, 348 and 350 on the retainer shaft 340.

As the jaw magazine 34 starts rotation as above, the old set of gripping jaws 36 that have been held in the second jaw change position B ride onto the jaw rests 164, 166 and 168 from the retainer pins 346, 348 and 350, respectively. These retainer pins remain in the working position of FIG. 6 throughout the rotation of the jaw magazine 34.

Then the multipurpose cylinder piston 362 is lowered (see FIG. 11) for the following four purposes:

1. The pushing of the unlocking member 88 into the chuck slide 52, with the consequent retraction of the primary detent 60 of the locking mechanism 58 against the forces of the compression springs 74 so as not to interfere with the first new gripping jaw 32' to be subsequently transferred from the jaw magazine 34.

2. The positioning of the chuck body 30 with respect to the jaw guide 42.

3. The retraction of the retainer pins 346, 348 and 350 on the retainer shaft 340 out of engagement with the new set of gripping jaws 32' in the jaw groove 150 in the second jaw change position B.

4. The engagement of the new set of gripping jaws 32' by the protuberances 262, 264 and 266 on the transfer rod 258.

Then the transfer cylinder body 250 is lowered (see FIG. 10) to cause the descent of the transfer rod 258 the required distance P. The transfer rod 258 transfers the lowermost one of the new set of gripping jaws 32' into that jaw guideway 54 in the chuck body 30 which is being held in the first jaw change position A. Further the transfer rod 258 carries the uppermost gripping jaw to the middle position on the jaw magazine 34, and the intermediate gripping jaw to the lowermost position thereon.

Then the multipurpose cylinder piston 362 is raised for the following purposes:

1. The locking of the first new gripping jaw 32' by the primary detent 60 of the associated locking mechanism 58.

2. The withdrawal of the positioning pin 374 from the positioning hole 376 in the chuck slide 52.

3. The disengagement of the protuberances 262, 264 and 266 on the transfer rod 258 from the new set of gripping jaws 32'.

4. The engagement of the upper two new gripping jaws 32', lying in the middle and lowermost positions on the jaw magazine 34 as above, by the lower two retainer pins 348 and 350 on the retainer shaft 340.

The locking of the first new gripping jaw 32' on the chuck body 30 takes place as the primary detent 60 is sprung into toothed engagement therewith upon release of the unlocking member 88 by the push pin 372 on the multipurpose cylinder piston rod 366.

Then the transfer cylinder 240 operates to return the unloaded transfer rod 258 into the jaw magazine 34. Then the work spindle 26 of the N/C lathe 22 is turned an angle required to bring the next jaw guideway 54 in the chuck body 30, from which the gripping jaw 32 was withdrawn for the second time, to the first jaw change position A.

Thereafter the foregoing cycle of operation is repeated to transfer the second, and then the third, gripping jaws from jaw magazine 34 to chuck body 30.

Then the radial cylinder 116 of the radial transport mechanism 48 operates to raise the complete jaw change assembly 44 away from the chuck 28. Then the longitudinal cylinder 96 of the longitudinal transport mechanism operates to return the jaw change assembly 44 to the retracted position of FIG. 1 together with the carriage 92. A change from one set of gripping jaws 32 to another 32' has now been completed.

Possible Modifications

The preferred form of the chuck jaw changer disclosed in the foregoing is by way of example only and is not intended to impose limitations upon the invention. A variety of modifications or variations of the disclosed embodiment will readily occur to one skilled in the art without departing from the spirit or scope of the invention as expressed in the claims appended hereto. The following is a brief list of such possible modifications:

1. Each gripping jaw on the chuck body may be locked against radial displacement by the associated slide, instead of by the spring loaded detent, with the slide made movable into and out of positive engagement with the jaw as by a fluid actuated cylinder mounted on the rear end of the work spindle.

2. All the gripping jaws of the chuck may be simultaneously locked and unlocked with respect to the chuck body.

3. The gripping jaws may be locked and unlocked by pivotable means, instead of by the linearly movable members.

4. The jaw magazine may not be in the form of a rotary cylinder or drum but may take the form of a flat plate movable linearly, with a required number of jaw grooves defined therein side by side.

5. The jaw guide may be omitted, although its provision is preferred because it can accurately guide the gripping jaws into the jaw guideways in the chuck body and into the jaw grooves in the jaw magazine even if a substantial spacing exists between chuck body and jaw magazine.

What is claimed is:

1. A chuck jaw changer for use with a machine tool (22) having a work spindle (26), said jaw changer operable with a plurality of interchangeable sets of gripping jaws (32, 32'), comprising:

(a) a chuck (28) having a chuck body (30) adapted to be mounted on the work spindle (26) of the machine tool, the chuck body having a plurality of jaw guideways (54) arranged radially of the work spindle for replaceably receiving a set of slidable gripping jaws (32) for chucking and unchucking work, each gripping jaw being slid into and out of one of the jaw guideways in a radial direction of the work spindle when that jaw guideway is in a preassigned first jaw change position on the work spindle;

(b) a jaw magazine (34) in the form of a hollow cylinder adapted to be mounted on the machine tool and being rotatable relative thereto about an axis oriented radially of the work spindle of the machine tool, said jaw magazine having a plurality of jaw grooves (150) at circumferential spacings in said hollow cylinder, each jaw groove adapted to receive an additional set of gripping jaws (32') or the first recited set of gripping jaws (32), as the latter are withdrawn from the chuck body, said gripping jaws releasably engaged in said grooves and in alignment;

(c) an indexing mechanism (35) disposed internally of said cylindrical jaw magazine (34) for moving the jaw magazine relative to the machine tool so as to bring any one of the jaw grooves, with or without a set of gripping jaws engaged therein, to a preassigned second jaw change position where the jaw groove is in line with that one of the jaw guideways in the chuck body which is in the first jaw change position, the aligned gripping jaws in the first jaw change position and in the second jaw change position being held at constant pitch distances; and (d) a jaw transfer mechanism (36) disposed internally of said cylindrical jaw magazine (34) and movable between the chuck and the jaw magazine a distance equal to the pitch distance between the gripping jaws aligned in the first and second jaw change positions, the jaw transfer mechanism being capable of simultaneously engaging the set of gripping jaws being held in the jaw groove in the second jaw change position for transferring the same into the successive jaw guideways being held in the first jaw change position, the jaw transfer mechanism being further capable of engaging the gripping jaw being held in the jaw guideway in the first jaw change position for transferring the same into the jaw groove in the second jaw change position;

(e) whereby each complete set of gripping jaws can be transferred from the chuck body to the jaw magazine, or vice versa, while the jaw magazine is standing still on the machine tool with one of the jaw grooves held in the second jaw change position.

2. The chuck jaw changer of claim 1 further comprising a jaw guide (42) for providing a substantially continuous, rectilinear guide track (384) between that one of the jaw guideways (54) in the chuck body (30) which is in the first jaw change position and that one of the jaw grooves (150) in the jaw magazine (34) which is in the second jaw change position, for the smooth transfer of the gripping jaws (32, 32') therebetween by the jaw transfer mechanism (36).

3. The chuck jaw changer of claim 2 further comprising a longitudinal transport mechanism (46) for jointly moving the jaw magazine (34) and the indexing mechanism (35) and the jaw transfer mechanism (36) in the longitudinal direction of the work spindle (26) of the machine tool (22) relative to the same between a first retracted position away from the chuck (28) and a second working position closer to the chuck.

4. The chuck jaw changer of claim 3 wherein the longitudinal transport mechanism (46) comprises:

(a) a carriage (92) movable on the machine tool (22) between said retracted first and second working positions, the carriage having the jaw magazine (34) rotatably mounted thereon and having the indexing mechanism (35) and jaw transfer mechanism (36) nonrotatably mounted thereon; and (b) means (96) on the machine tool for moving the carriage between said retracted first and second working positions.

5. The chuck jaw changer of claim 4 further comprising a radial transport mechanism (48) on the carriage (92) of the longitudinal transport mechanism (46) for jointly moving the jaw magazine (34), the indexing mechanism (35), the jaw transfer mechanism (36) and the jaw guide (42) in a radial direction of the work spindle (26) of the machine tool (22) relative to the carriage, the radial transport mechanism moving the jaw magazine and the indexing mechanism and the jaw transfer mechanism toward the chuck (28) for jaw change and away from the chuck upon completion of the jaw change when the carriage is in the second working position.

6. The chuck jaw changer of claim 5 wherein the jaw magazine (34) is in the form of a hollow cylinder having the jaw grooves (150) defined at circumferential spacings therein, and wherein the radial transport mechanism (48) comprises:

(a) a column (112) rigidly mounted on the carriage (92) of the longitudinal transport mechanism (46) and extending in a radial direction of the work spindle (26) of the machine tool (22);

(b) a hollow magazine spindle (122) slidably fitted over the column and constrained to only axial displacement relative to the same; and (c) means (116) for reciprocably moving the magazine spindle axially relative to the column;

(d) the magazine spindle having the jaw magazine concentrically and rotatably mounted thereto and having the indexing mechanism (35) and the jaw transfer mechanism (36) nonrotatably mounted thereon.

7. The chuck jaw changer of claim 1 wherein the chuck further comprises:

(a) a plurality of slides (52) slidably engaged respectively in another set of radial guide ways (50) defined in the chuck body (30) and disposed opposite the respective gripping jaws (32) engaged in the jaw guideways (54) in the chuck body;

(b) a locking mechanism (58) for locking each gripping jaw against displacement relative to the opposed one of the slides; and (c) means (86) acting on the slides for moving the gripping jaws radially of the chuck body.

8. The chuck jaw changer of claim 7 further comprising an unlocking mechanism (40) operatively associated with the jaw transfer mechanism (36) for causing one of the locking mechanisms (58) to unlock the gripping jaw (32) engaged in that one of the jaw guideways (54) in the chuck body (30) which is held in the first jaw change position, preparatory to the transfer of the gripping jaw from the chuck body to the jaw magazine (34).

9. The chuck jaw changer of claim 1 wherein the jaw magazine (34) is disposed upstandingly on the machine tool (22) and is provided with a plurality of annular jaw rests (164, 166, 168) arranged concentrically therewith and at vertical spacings with respect to one another for holding thereon the gripping jaws (32') received in the jaw grooves (150) in the jaw magazine.

10. The chuck jaw changer of claim 9 wherein each jaw rest (164, 166, 168) is nonrotatable relative to the machine tool (22) and is partly cut off (170) in the second jaw change position of the jaw grooves (150) for the passage of the gripping jaws (32, 32') being transferred between the chuck body (30) and the jaw magazine (34).

11. The chuck jaw changer of claim 10 wherein the top edge (182) of the lowermost one (168) of the jaw rests (164 166, 168), slidably holding the gripping jaws (32') thereon, slope downwardly as it extends toward the opposite extremities of the jaw rest bounding the part where it is cut off.

12. The chuck jaw changer of claim 1 wherein said jaw transfer mechanism (36) comprises an elongated member (258) extending along a jaw groove (150) in the jaw magazine which is in the second jaw change position, said elongated member having means (262, 264, 266) within the jaw magazine engageable with at least one of said gripping jaws (32') being held in a jaw groove which is in the second jaw change position.

13. A chuck jaw changer for use with a machine tool (22) having a work spindle (26), said jaw changer operable with a plurality of interchangeable sets of gripping jaws (32, 32'), comprising:
(a) a chuck (28) having a chuck body (30) adapted to be mounted on the work spindle (26) of the machine tool, the chuck body having a plurality of jaw guideways (54) arranged radially of the work spindle for replaceably receiving a set of slidable gripping jaws (32) for chucking and unchucking work, each gripping jaw being slide into and out of one of the jaw guideways in a radial direction of the work spindle when that jaw guideway is in a preassigned first jaw change position on the work spindle;
(b) a jaw magazine (34) adapted to be operatively mounted on the machine tool and having a plurality of jaw grooves (150) therein, each jaw groove adapted to receive an additional set of gripping jaws (32'), or the first recited set of gripping jaws (32), as the latter are withdrawn from the chuck body, said gripping jaws releasably engaged in said grooves and in alignment;
(c) an indexing mechanism (35) for moving the jaw magazine relative to the machine tool so as to bring any one of the jaw grooves, with or without a set of gripping jaws engaged therein, to a preassigned second jaw change position where the jaw groove is in line with that one of the jaw guideways in the chuck body which is in the first jaw change position, the aligned gripping jaws in the first jaw change position and in the second jaw change position being held at constant pitch distances; and
(d) a jaw transfer mechanism (36) movable between the chuck and the jaw magazine a distance equal to the pitch distance between the gripping jaws aligned in the first and second jaw change positions, the jaw transfer mechanism being capable of simultaneously engaging the set of gripping jaws being held in the jaw groove in the second jaw change position for transferring the same into the successive jaw guideways being held in the first jaw change position, the jaw transfer mechanism being further capable of engaging the gripping jaw being held in the jaw guideway in the first jaw change position for transferring the same into the jaw groove in the second jaw change position, said jaw transfer mechanism (36) comprising a transfer rod (258) extending along that one of the jaw grooves (150) in the jaw magazine (34) which is in the second jaw change position, said transfer rod supported within said jaw magazine both for rotation about its own axis and for longitudinal movement between the jaw magazine and the chuck body (30), and a plurality of protuberances (262, 264, 266) on the transfer rod movable, with the rotation of the transfer rod, into and out of engagement with the set of gripping jaws (32') being held in that one of the jaw grooves in the jaw magazine which is in the second jaw change position, one of the protuberances being further movable into and out of engagement with the gripping jaw (32) being held in that one of the jaw guidewys (54) in the chuck body which is in the first jaw change position;
(e) whereby each complete set of gripping jaws can be transferred from the chuck body to the jaw magazine, or vice versa, while the jaw magazine is standing still on the machine tool with one of the jaw grooves held in the second jaw change position.

14. The chuck jaw changer of claim 13 further comprising a retractable retainer assembly (38) for retaining the gripping jaws (32, 32') in that one of the jaw grooves (150) in the jaw magazine (34) which is in the second jaw change position, when the protuberances (262, 264, 265) on the transfer rod (258) of the jaw transfer mechanism (36) are moved out of engagement with the gripping jaws.

15. The chuck jaw changer of claim 14 wherein the retractable retainer assembly (38) comprises:
(a) a rotatable retainer shaft (340) extending along the transfer rod (258) of the jaw transfer mechanism (36); and
(b) a plurality of retainers (346, 348, 350) projecting laterally from the retainer shaft for movement into and out of engagement with the gripping jaws 32, 32') with the rotation of the retainer shaft.

16. The chuck jaw changer of claim 15 wherein the chuck (28) is further provided with a locking mechanism (58) for locking each gripping jaw (32) against displacement relative to the chuck body (30), and wherein the chuck jaw changer further comprises:
(a) a fluid actuated, double ended rod cylinder (324) having first and second piston rods (366, 322), the first piston rod acting on the locking mechanism to cause the same to unlock the gripping jaw engaged in that one of the jaw guideways (54) in the chuck body which is held in the first jaw change position, preparatory to the transfer of the gripping jaw from the chuck body to the jaw magazine (34);
(b) cam means (272, 290) for translating the linear reciprocation of the second piston rod (322) of the cylinder into bidirectional rotation; and
(c) gear means (288, 292, 352) for imparting the bidirectional rotation of the cam means to the transfer rod (258) of the jaw transfer mechanism (36) and to the retainer shaft (340) of the retractable retainer assembly (38).

17. The chuck jaw changer of claim 16 further comprising a jaw guide (42) formed in a fixed relation with the double ended rod cylinder (324) for providing a substantially continuous, rectilinear guide track between that one of the jaw guideways (54) in the chuck body (30) which is in the first jaw change position and that one of the jaw grooves (150) in the jaw magazine (34) which is in the second jaw change position, for the smooth transfer of the gripping jaws (32, 32') therebetween.

18. The chuck jaw changer of claim 17 wherein the first piston rod (366) of the double ended rod cylinder (324) is further adapted to hold any of the jaw guideways (54) in the chuck body (30) in the exact first jaw change position by locking the chuck body against displacement relative to the jaw guide (42) during jaw transfer.

19. A chuck jaw changer for use with a machine tool (22) having a work spindle (26), said jaw changer operable with a plurality of interchangeable sets of gripping jaws (32, 32'), comprising:
(a) a chuck (28) having a chuck (30) adapted to be mounted on the work spindle (26) of the machine tool, the chuck body having a first set of jaw guideways (54) arranged radially of the work spindle for replaceably receiving a set of slidable gripping jaws (32) for chucking and unchucking work, each gripping jaw being slid into and out of one of the jaw guideways in a radial direction of the work spindle when that jaw guideway is in a preassigned first jaw change position on the work spindle, said chuck (28) further comprising a plurality of slides (52) slidably engaged respectively in a second set of radial guideways (50) positioned in the chuck body (30) and disposed opposite the respective gripping jaws (32) slidably engaged in the jaw guideways (54) in the chuck body, a locking mechanism (58) for locking each gripping jaw against displacement relative to the opposed one of the slide, means (86) acting on the slides for moving the gripping jaws radially of the chuck body, and an unlocking member (88) to be activated for causing each locking mechanism (58) to unlock the corresponding gripping jaw (32);

(b) a jaw magazine (34) adapted to be operatively mounted on the machine tool and having a plurality of jaw grooves (150) therein, each jaw groove adapted to receive an additional set of gripping jaws (32') or the first recited set of gripping jaws (32), as the latter are withdrawn from the chuck body, said gripping jaws releasably engaged in said grooves and in alignment;

(c) an indexing mechanism (35) for moving the jaw magazine relative to the machine tool so as to bring any one of the jaw grooves, with or without a set of gripping jaws engaged therein, to a preassigned second jaw change position where the jaw groove is in line with that one of the jaw guideways in the chuck body which is in the first jaw change position, the aligned gripping jaws in the first jaw change position and in the second jaw change position being held at constant pitch distances;

(d) a jaw transfer mechanism (36) movable between the chuck and the jaw magazine a distance equal to the pitch distance between the gripping jaws aligned in the first and second jaw change positions, the jaw transfer mechanism being capable of simultaneously engaging the set of gripping jaws being held in the jaw groove in the second jaw change position for transferring the same into the successive jaw guideways being held in the first jaw change position, the jaw transfer mechanism being further capable of engaging the gripping jaw being held in the jaw guideway in the first jaw change position for transferring the same into the jaw groove in the second jaw change position;

(e) a jaw guide (42) for providing a substantially continuous, rectilinear guide track (384) between that one of the jaw guideways (54) in the chuck body (30) which is in the first jaw change position and that one of the jaw grooves (150) in the jaw magazine (34) which is in the second jaw change position, for the smooth transfer of the gripping jaws therebetween by the jaw transfer mechansim (36);

(f) a fluid actuated cylinder (324) formed substantially integral with the jaw guide, said fluid actuated cylinder having a piston rod (366) thereon;

(g) a push pin (372) on the piston rod (366) of the fluid actuated cylinder for activating each unlocking member (88) of the chuck; and (h) a positioning pin (374) on the piston rod of the fluid actuated cylinder, a bore (376) in each slide (52) of the chuck, said positioning pin (374) engageable with said bore (376) for holding any of the jaw guideways (54) in the chuck body in the exact first jaw change position with respect to said jaw guide;

(i) whereby each complete set of gripping jaws can be transferred from the chuck body to the jaw magazine, or vice versa, while the jaw magazine is standing still on the machine tool with one of the jaw grooves held in the second jaw change position.

* * * * *